(12) United States Patent
Ozog

(10) Patent No.: US 9,369,422 B1
(45) Date of Patent: Jun. 14, 2016

(54) EVENT-BASED NETWORKING SYSTEM, METHOD, AND COMPUTER PROGRAM PRODUCT

(71) Applicant: OZOG MEDIA, LLC, Newark, DE (US)

(72) Inventor: Jesse Ozog, Bethesda, MD (US)

(73) Assignee: Ozog Media, LLC, Newark, DE (US)

( * ) Notice: Subject to any disclaimer, the term of this patent is extended or adjusted under 35 U.S.C. 154(b) by 433 days.

(21) Appl. No.: 13/685,686

(22) Filed: Nov. 26, 2012

Related U.S. Application Data

(63) Continuation of application No. 13/557,198, filed on Jul. 24, 2012.

(60) Provisional application No. 61/511,750, filed on Jul. 26, 2011.

(51) Int. Cl.
| | |
|---|---|
| G06F 15/16 | (2006.01) |
| H04L 12/58 | (2006.01) |
| G06Q 30/02 | (2012.01) |
| H04L 29/06 | (2006.01) |
| H04L 29/08 | (2006.01) |

(52) U.S. Cl.
CPC ............ *H04L 51/32* (2013.01); *G06Q 30/0251* (2013.01); *H04L 51/10* (2013.01); *H04L 65/403* (2013.01); *H04L 67/02* (2013.01); *H04L 67/306* (2013.01)

(58) Field of Classification Search
CPC ....... H04L 65/403; H04L 51/32; H04L 51/10; H04L 67/02; H04L 67/306; G06F 17/3053; G06F 9/542; G06Q 30/0261; G06Q 30/0269
USPC ................ 709/204; 705/10, 14.52, 14.58
See application file for complete search history.

(56) References Cited

U.S. PATENT DOCUMENTS

| | | | |
|---|---|---|---|
| 2002/0090954 A1* | 7/2002 | Tanaka et al. ................. 455/456 |
| 2008/0133336 A1* | 6/2008 | Altman et al. .................. 705/10 |
| 2010/0325194 A1* | 12/2010 | Williamson ............ H04W 4/02 709/203 |
| 2012/0136689 A1* | 5/2012 | Ickman et al. ............... 705/7.19 |
| 2012/0197723 A1* | 8/2012 | Watfa et al. ................ 705/14.58 |
| 2015/0172393 A1* | 6/2015 | Oplinger ................ H04L 67/10 709/204 |

OTHER PUBLICATIONS

Office Action dated Feb. 1, 2016 associated with U.S. Appl. No. 13/557,198.

\* cited by examiner

*Primary Examiner* — Oleg Survillo
*Assistant Examiner* — Imran Moorad
(74) *Attorney, Agent, or Firm* — Patrick E. Caldwell, Esq.; The Caldwell Firm, LLC

(57) ABSTRACT

A system, method, and computer program product are provided for listing a plurality of contacts from a contact data structure. In operation, an event-based social network is built, based on selections made in association with the listing. Additionally, a map including at least one location of at least a portion of the plurality of contacts is presented, in association with the event-based social network.

20 Claims, 22 Drawing Sheets

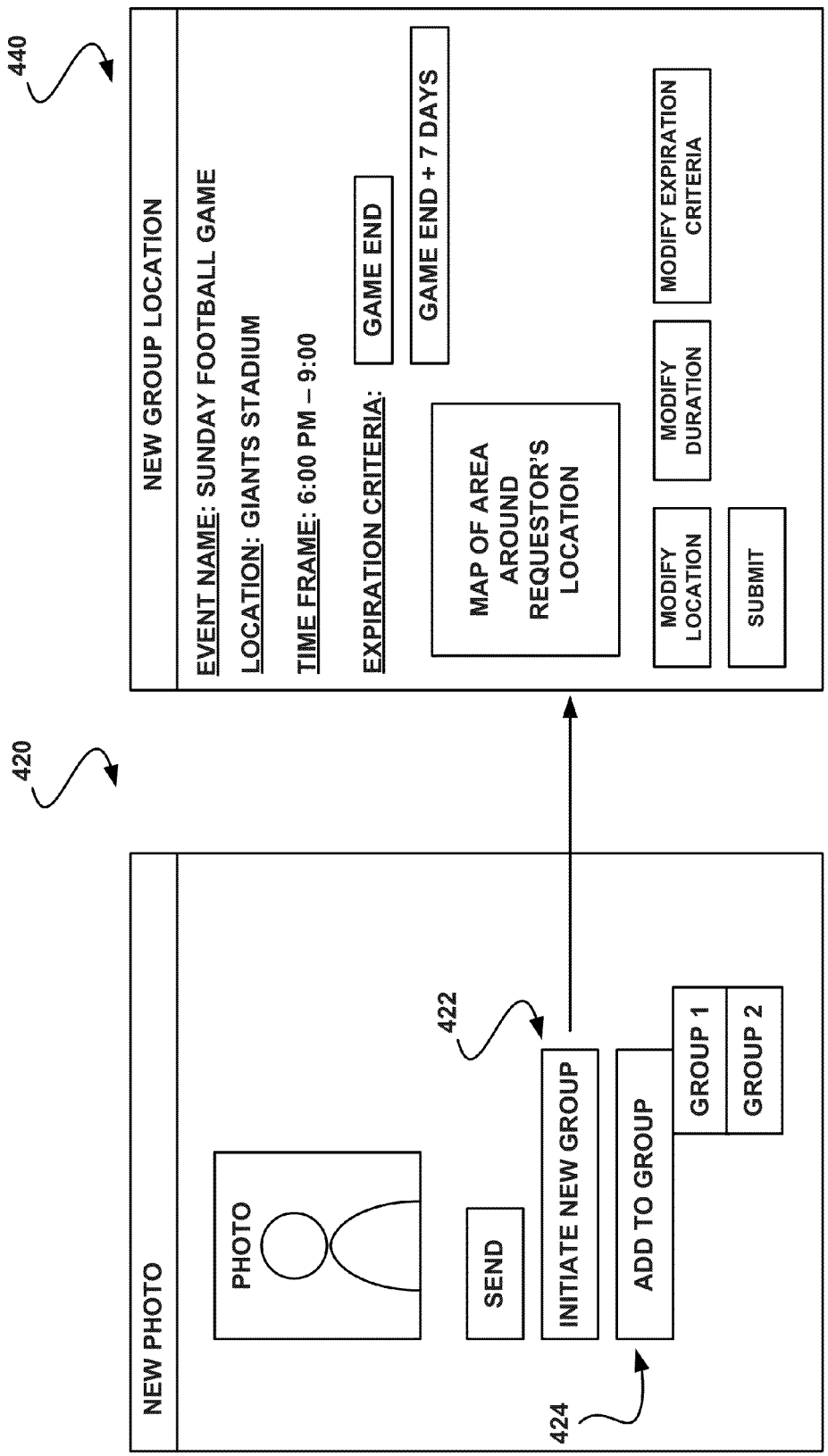

820

| ADVERTISEMENT STATUS REPORT | |
|---|---|
| CRITERIA MET? | YES |
| ADVERTISEMENT PRESENTED/SENT? | YES |
| NUMBER OF ADVERTISEMENT READ RECEIPTS | 20 |
| NUMBER OF MEMBERS RESPONSE INDICATORS | 10 |
| CURRENT ADVERTISEMENT SUCCESS RATE | 50% |

[ CUSTOMIZE ]   [ REFRESH ]

FIGURE 8B

EVENT-BASED NETWORKING SYSTEM, METHOD, AND COMPUTER PROGRAM PRODUCT

RELATED APPLICATION(S)

The present application claims priority to U.S. Provisional Application No. 61/511,750, filed Jul. 26, 2011 as well as U.S. patent application Ser. No. 13/557,198, filed Jul. 24, 2012, both of which are incorporated herein by reference in their entirety.

FIELD OF THE INVENTION AND BACKGROUND

The present invention relates to networking, and more particularly to building a network.

SUMMARY

A system, method, and computer program product are provided for listing a plurality of contacts from a contact data structure. In operation, an event-based social network is built, based on selections made in association with the listing. Additionally, a map including at least one location of at least a portion of the plurality of contacts is presented, in association with the event-based social network.

BRIEF DESCRIPTION OF THE DRAWINGS

FIG. 4B shows a user interface for initiating a group associated with a location based social network capable of being managed, in accordance with one embodiment.

FIG. 4C shows a user interface for registering a group associated with a location based social network, in accordance with one embodiment.

FIG. 8B shows a user interface for advertisement reporting associated with presenting an advertisement to a location based social network group, in accordance with one embodiment.

DETAILED DESCRIPTION

Figure 1:
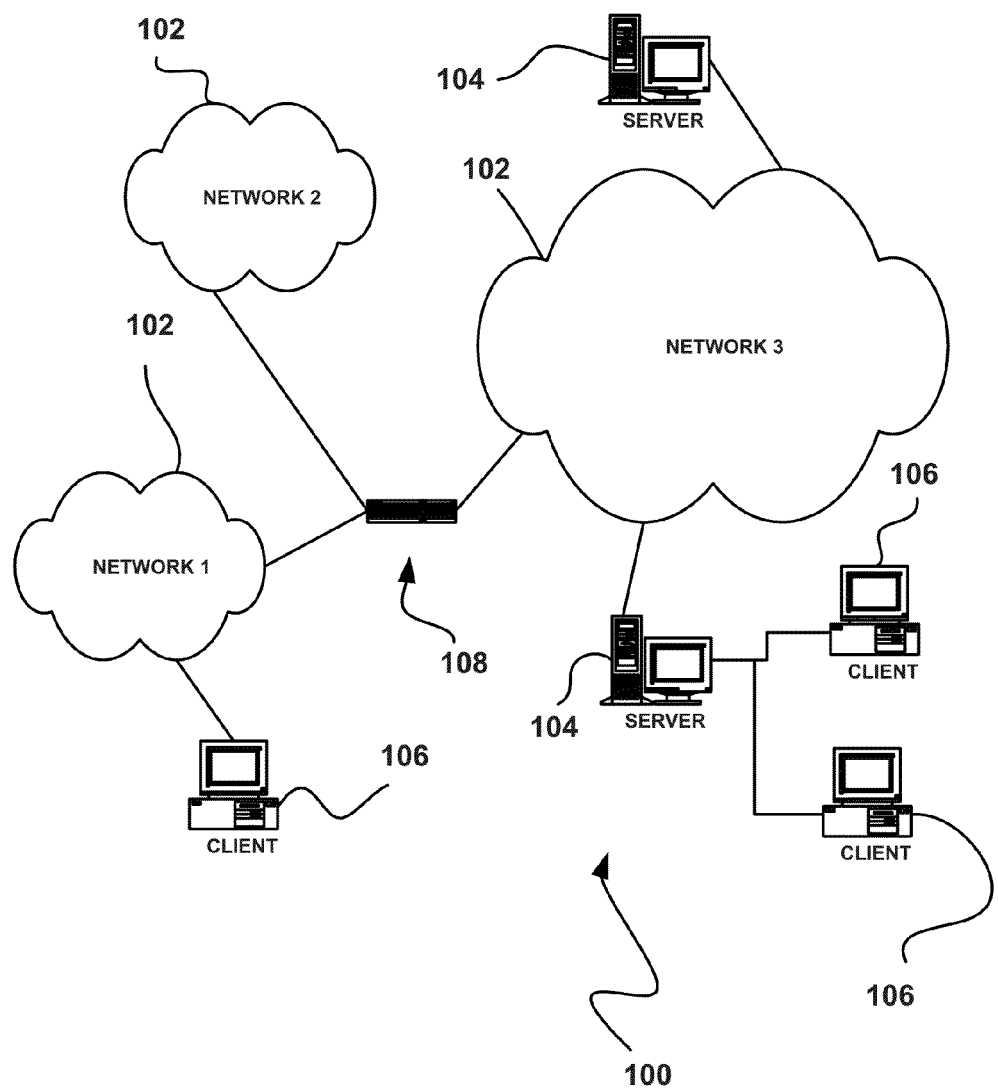
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g., printer, etc.), any component of a computer, and/or any other type of logic. In order to facilitate communication among the networks 102, at least one gateway 108 is optionally coupled therebetween.

Figure 2:
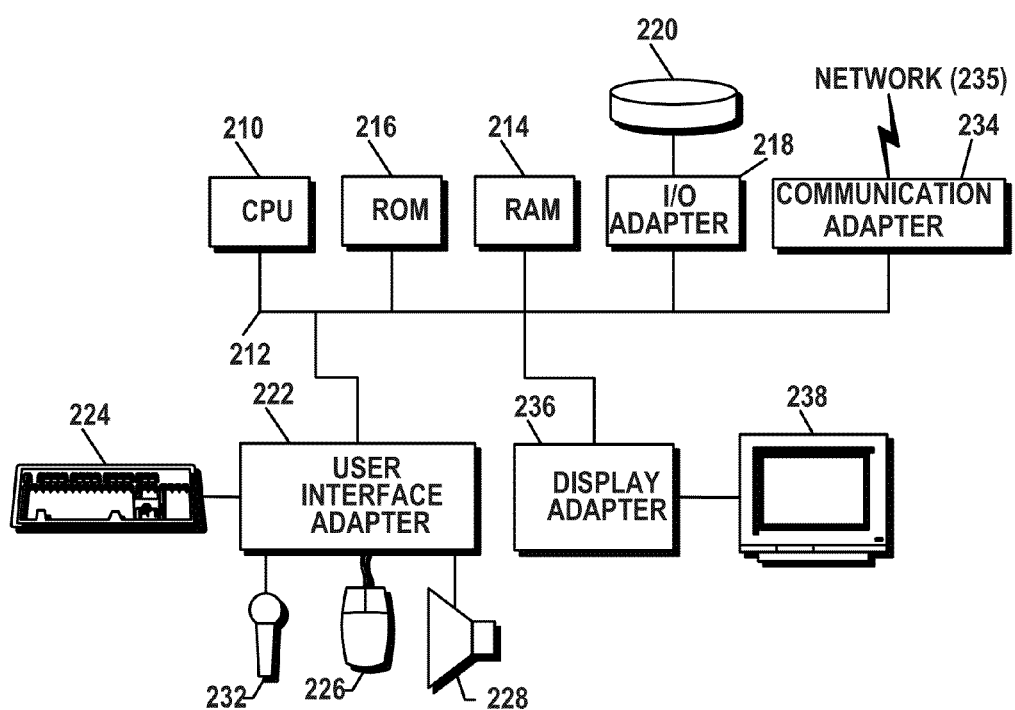
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, Objective C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
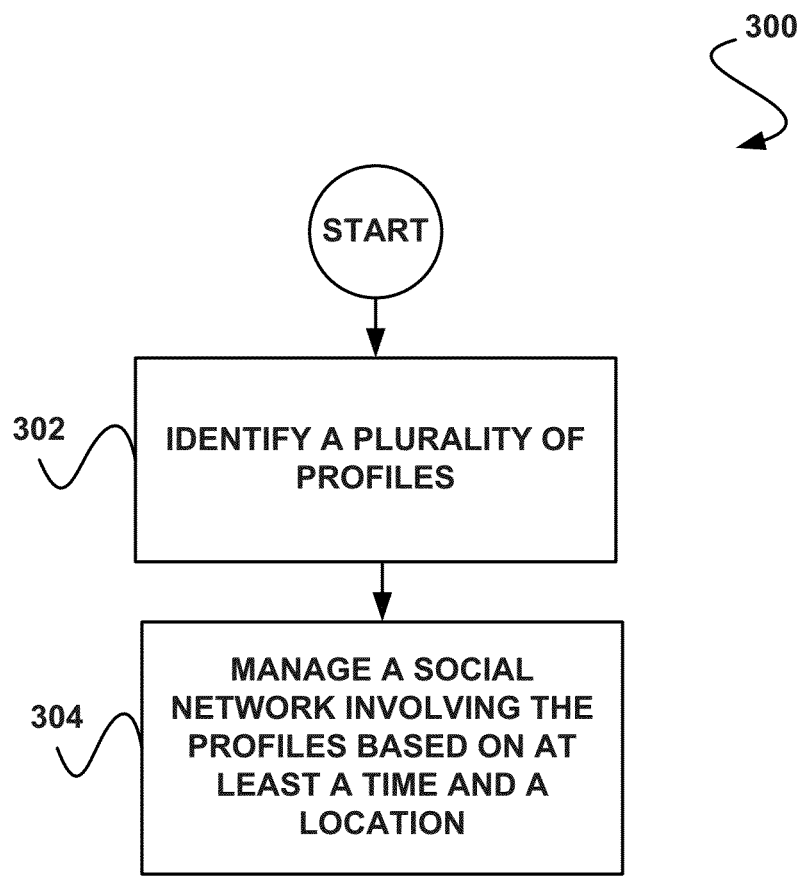
FIG. 3 shows a method for managing a social network based on at least a time and a location, in accordance with one embodiment.

FIG. 3 shows a method 300 for managing a social network based on at least a time and a location, in accordance with one embodiment. As an option, the method 300 may be implemented in the context of the architecture and environment of FIGS. 1 and/or 2, or any subsequent Figure(s). Of course, however, the method 300 may be carried out in any desired environment.

As shown, a plurality of profiles are identified. See operation 302. Additionally, a social network involving the profiles is managed based on at least a time and a location. See operation 304.

In the context of the present description, a profile refers to any collection of data associated with a specific entity. For example, in various embodiments, the profiles may include, but are not limited to, user profiles, business profiles, organization profiles, location profiles, object profiles, and/or any other profile capable of including information associated with a specific entity. Additionally, in the context of the present description, a social network refers to any social structure including profiles associated with entities (e.g., individuals, organizations, etc.), which may be connected by one or more specific types of interdependency (e.g., friendship, kinship, common interest, geographic location, etc.). For example, in one embodiment, the social network may include a map, structure, linkage, and/or other description of specified ties (e.g., friendship, etc.) between users associated with the profiles in the social network.

In various embodiments, any number of aspects of the social network may be managed based on criteria associated with time and/or a location. For example, in one embodiment, media associated with the social network may be managed based on time and/or location. In the context of the present description, media refers to any digital media. For example, in various embodiments, the media may include digital images, audio media (e.g., music, sound bites, etc.), video media, games, and/or any other type of digital media.

Further, managing the media may include managing any aspect of the media based on time and/or location. For example, in one embodiment, managing the media may include restricting an upload of media to a server associated with the social network, based on a time and/or a location. In another embodiment, managing the media may include determining and/or setting a deletion point of the media, based on time and/or location. In another embodiment, managing the media may include allowing or restricting access to the media, based on a time and/or location. In yet another embodiment, managing the media may include allowing certain types of media to be viewed, uploaded, and/or modified, based on a time and/or location.

Additionally, in one embodiment, profiles associated with the social network may be managed based on time and/or location. For example, in one embodiment, access to profiles may be permitted or restricted, based on location and/or time. In another embodiment, the addition of users associated with the profiles to the social network may be permitted or restricted, based on a location and/or time. In yet another embodiment, editing of profiles may be permitted or restricted, based on a location and/or time.

Furthermore, in one embodiment, the insertion of text on a web page associated with the social network may be managed. For example, in one embodiment, the insertion of text on a web page may be permitted or restricted, based on location and/or time. In one embodiment, commenting on media associated with the social network via text may be permitted or restricted, based on location and/or time.

In still another embodiment, establishment of, or access to, the social network may be permitted or restricted, based on time or location. For example, in one embodiment, the social network may not be accessible by a user device outside of a specified geographic area associated with the social network. In another embodiment, the social network may not be accessible by a user device outside of a specific time period associated with the social network. In yet another embodiment, the social network may only be accessible by a user device within a specified geographic area associated with the social network, as well as during a specific time period.

In various embodiments, the social network may be managed based on any number of location based criteria, time based criteria, or combination thereof. For example, in one embodiment, the social network may be associated with a geographical location, such as a building, a commercial establishment, a stadium, a city, a zip code, a street, a user configured boundary or perimeter, a vehicle (e.g., a plane, train, bus, car, boat, etc.), and/or any other type of location. In these cases, a variety of aspects of the social network (e.g., users, media, actions, exposure, etc.) may be managed based on the location.

In one embodiment, the social network may be exclusive to users within a boundary associated with the location. Further, in one embodiment, users outside of this boundary may not have the ability to join and/or view the social network. In another embodiment, users outside of the boundary, plus a predetermine distance (e.g., a configurable padding distance, etc.) may not have the ability to join and/or view the social network.

In another embodiment, the social network may be managed based on time criteria, such as a time period, a day, a week, a specific date, and/or any other time criteria. For example, in one embodiment, users may not have the ability to join and/or view the social network outside of a specific time period or specified time. In another embodiment, the social network may not be active outside of the specific time period or specified time. In various other embodiments, many different aspects of the social network may be managed based on time, such as access to media, the ability to publish media, the ability to contribute to the social network (e.g., by commenting, etc.), the ability to communicate between users, the ability to download media or advertisements associated with the social network, the ability to utilize advertisements offered via the social network, and/or various other aspects of the social network.

In yet another embodiment, the social network may be managed based on expiration permissions. For example, in one embodiment, media associated with the social network may be associated with an expiration time. In various embodiments, the expiration time may include a user defined expiration time (e.g., by a media provider, an administrator, a social network group manager, etc.), or an automatically defined expiration time based on various criteria.

In one embodiment, the social network may be associated with an expiration time. For example, in one embodiment, the social network may be set to expire at a specific time (e.g., a user defined time, an automatically defined time, etc.). In another embodiment, the social network may be set to expire with respect to a specific set of users or profiles.

In one embodiment, the social network may be set to expire based on a time between contributions passing a set/deterministic time period. For example, if an event associated with the location based social network is relatively ad hoc, and the time between updates is greater than twenty-four hours, then the location based social network associated with the event may be marked as closed/read only. As a specific example, a party at a house of a first user may be updatable during the party until four hours past the previous update. In one embodiment, new media uploads may function as a "keep-alive" for the location based social network, based on activity for that location.

In one embodiment, the social network may be managed based on location, time, and expiration permissions. For example, in one embodiment, a group of users may gather at a particular location at a specific time. In this case, the media for that particular location and group may be included in the same social network until the gathering ends (e.g., no more submissions after a time period, etc.). Further, in one embodiment, the media may be set to expire after a specified time period or at a specific time. For example, a gathering may last a week. In this case, at the end of the week (or a specified time period after the week, etc.), the media may expire.

In this way, location based groups may be created for an event at a particular time, where the media and other information provided by members of the group may be available for a period of time and may then auto expire. This allows users of the location group to utilize (e.g., view, update, etc.) the media for a period of time until the media expires, which prevents the need for maintaining a long media history of each user.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of profiles of operation 302, the managing of the social network based on time or location of operation 304, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 4A:
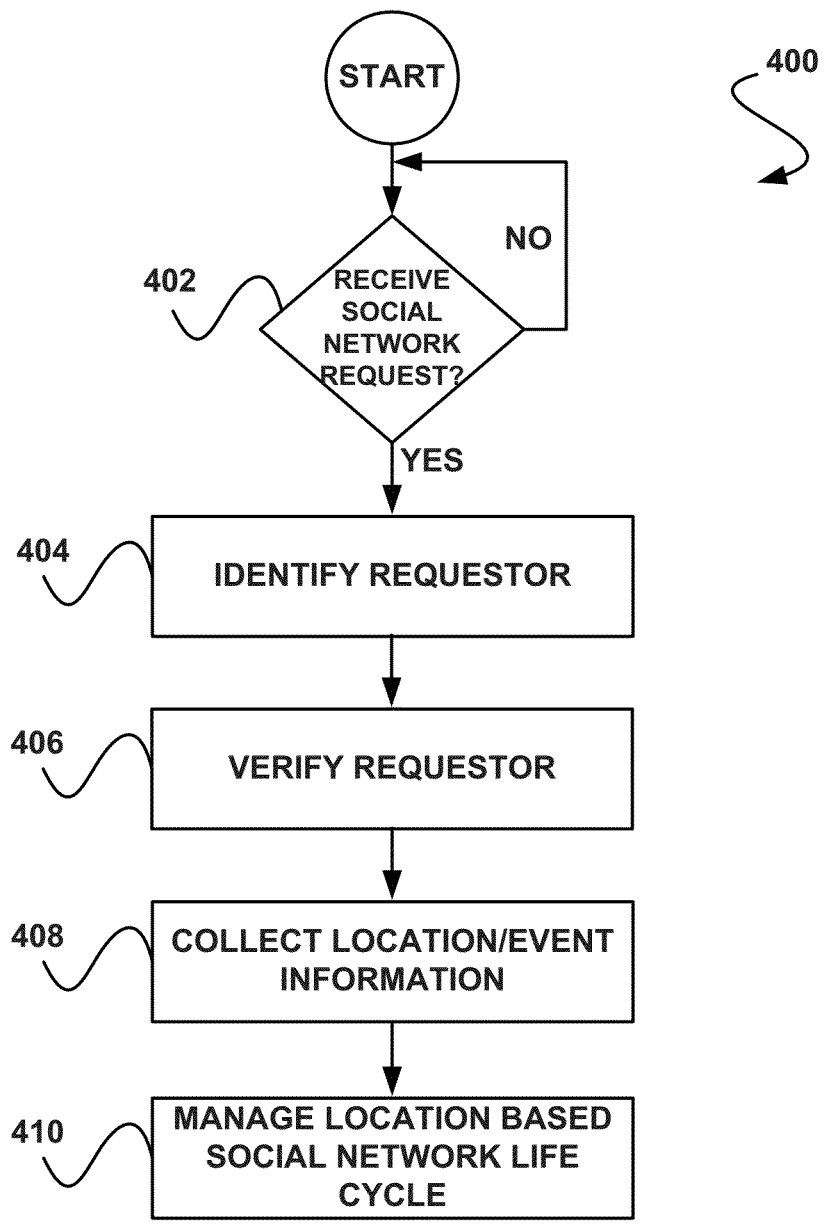
FIG. 4A shows a method for initiating a group associated with a social network capable of being managed, in accordance with one embodiment.

FIG. 4A shows a method 400 for initiating a group associated with a social network capable of being managed, in accordance with one embodiment. As an option, the method 400 may be implemented in the context of the architecture and environment of the previous Figures or any subsequent Figure(s). Of course, however, the method 400 may be carried out in any desired environment. It should also be noted that the aforementioned definitions may apply during the present description.

As shown, it is determined whether a request to initiate a location based social network is received. See decision 402. In various embodiments, the request may include an explicit request from a user (e.g., by the user sending request message, accepting of an offer to initiate, etc.) or an automated implicit request [e.g., based on a user location, in accordance with preference settings that indicate various aspects (e.g., type, genre, location, day/time, current members, etc.) of social networks that the user may be interested in requesting participation, etc.]. Additionally, in various embodiments, the request may accompany other information, such as location information, user information, digital media, device information, time information, billing information, description information associated with the social network (e.g., a name, user limit, etc.), content that is intended to be accessible utilizing the social network (e.g., a picture, text, etc.), and/or any other information.

The request may be sent from any device, such as a user mobile device (e.g., a computer, a phone, a PDA, etc.), a device associated with a location (e.g., a business server, check-in/ticketing mechanism, etc.), or any other device capable of sending the request. Furthermore, in various embodiments, the request may be received by a device associated with a location (e.g., a computing device, etc.), a device associated with a service for providing and/or hosting the social network (e.g., a networked server, etc.), and/or any other device associated with the social network.

In various embodiments, the request may be initiated utilizing different techniques. For example, in one embodiment, the request may be sent as a text message (e.g., an SMS message, an MMS message, etc.). In another embodiment, the request may be sent via an email. In one embodiment, the request may be sent via a proprietary protocol format that the application uses to communicate via a backend server. Furthermore, in yet another embodiment, the request may be sent via a standards based protocol (e.g., a Hypertext Transfer Protocol (HTTP) protocol, etc.). In still yet another embodiment, the request may be initiated utilizing a user interface (e.g., a locally stored user interface, a web-based user interface, etc.).

In addition to receiving the request, the requestor that sent the request is identified. See operation 404. In one embodiment, the request may be accompanied by information associated with the requestor, such that the requestor may be identified. The information may include any information capable of being used to identify the requestor, such as a name of the requestor, an identifier of the requestor, an address, a phone number, user device information (e.g., a device ID, IP address, MAC address, etc.), billing information, a username, a password, an entity name (e.g., a company name, etc.), a coupon code, biometric data, and/or any other type of information.

In another embodiment, information used to identify the requestor may be obtained separate from the request. For example, in one embodiment, the user may be prompted to supply information (e.g., via a user interface, etc.). In another embodiment, user device information may be used to identify the requestor. Still yet, the request may prompt a look-up of information in a separate database(s) or service.

In addition to identifying the requestor, the requestor is verified. See operation 406. In one embodiment, verifying the requestor may include determining whether the requestor is authorized to initiate the social network. In another embodiment, the verification may include verifying that the requestor is associated with valid billing information. In another embodiment, the verification may include comparing requestor data to data stored in a database to determine whether to authorize the requestor. In other embodiments, the verification may involve determining: whether the requester is a registered user of a service, whether the user is permitted to partake in the social network based on the user's preferences/settings and/or those of others that have or may join the social network and/or those of the social network itself. For example, the social network may restrict requests based on requester user profile information and, similarly, the user may restrict the types of social networks that the user may be interested in requesting participation, thereby requiring a cross-reference of such preferences/settings during the verification process. In one embodiment, the verification of operation 406 and the identifying of operation 404 may or may not be part of the same process.

Further, location and/or event information is collected. See operation 408. In one embodiment, the location and/or event information may accompany the request to initiate the social network. In another embodiment, the location and/or event information may be provided separate from the request. For example, in one embodiment, the location and/or event information may be provided by a user using a user interface (e.g., the user interface of FIG. 4B, etc.), a third party hosting/managing an event/location, an advertiser, a collaborative effort among multiple requesters, current members, or the like.

The location and/or event information may include any information associated with the location of the requestor, location of the initiated social network, information associated with a specific event (e.g., a game, a happy hour, etc.), and/or various other information. For example, in one embodiment, the requestor may desire to initiate a location based social network for a specific event. In this case, the information collected may include information associated with the event (e.g., a name, place, activity type, a duration, an expiration time, etc.).

Furthermore, in another embodiment, the information collected may include geo-location information associated with the user. In one embodiment, the requestor may explicitly provide the location information (e.g., by providing an address, a building name, GPS coordinates, etc.). In another embodiment, the location information may be provided automatically. For example, in various embodiments, the location information may be automatically provided via an IP address associated with the requestor, hotspot trilateration, texted location information, mobile phone tracking, GPS coordinates, and/or various other techniques. Further, in one embodiment, the location may be identified utilizing an automated geo-location process and a manual confirmation process combined. In one embodiment, the location information and/or the event information collected may be utilized to establish boundaries for the location based social network.

Additionally, in one embodiment, a location may be associated with the social network and the associating may include receiving a definition of the location. As an option, the definition of the location may be received utilizing user input in association with a map. For example, in one embodiment, a user may utilize an interactive map to define the location (e.g., by tracing an area, selecting a building, highlighting an area, selecting an area, entering points used to determine the location, etc.).

In another embodiment, the location may be identified utilizing a check-in process. For example, a user may indicate the user is in a specific location (e.g., a restaurant, a bar, a stadium, etc.) utilizing a check-in process. The check-in process may include a manual check-in process or an automatic check in process. For example, in one embodiment, a device associated with a user may be detected in a specific location. In various embodiments, this detection may include detecting utilizing a pairing technique, a chirp, transmitted GPS coordinates, or any other detection technique. Using the detected location information, a user may be determined to be in a location and a check-in process may be initiated.

In another embodiment, a user may indicate the user is in a specific location manually. For example, a user may submit check-in information utilizing a user device. In various embodiments, the user may provide check-in information utilizing a GUI (e.g., a GUI stored on a mobile device, a web-based GUI, etc.), a text message, an email, swiping a near-field/short-range communication interface of a mobile device with a kiosk, scanning of a bar code (e.g., a bar code associated with an application, etc.), and/or any other technique for providing check-in information. In one embodiment, a quick response (QR) code associated with the location may be scanned to perform an automatic check-in. For example, a user may take a picture and a QR code may be associated with the picture (e.g., overlaid on the picture, in the background of the picture, etc.) that may be used for an automatic check-in process.

In one embodiment, an application (e.g., stored on the user device, pushed to the user device, etc.) may automatically be executed upon entering a location (e.g., based on automatic location detection of device, etc.). In one embodiment, the application may offer the user an opportunity to check in to a location (e.g., using a check-in button, etc.).

In another embodiment, the location information and/or the event information may be utilized to establish a duration for the location based social network. For example, in one embodiment, the event information may be used to indicate a duration in which the social network will be active (e.g., the duration of a ball game, etc.).

Once the location based social network is initiated, users associated with a location corresponding to the social network may have the ability to join based on various criteria. In one embodiment, these users may become a location based group that is part of the location based social network. Further, once the location based social network is established, the life cycle of the location based social network may be managed. See operation 410.

In various embodiments, managing the life cycle of the social network may include managing the addition of users and/or profiles to the location based social network, managing media associated with the social network (e.g., access, expiration, etc.), monitoring a location of the users associated with the location based social network, managing expiration of the social network (e.g., based on time, location change, an amount of users, etc.), and/or any of the various features disclosed herein.

FIG. 4B shows a user interface 420 for initiating a group associated with a location based social network capable of being managed, in accordance with one embodiment. As an option, the user interface 420 may be implemented in the context of the architecture and environment of the previous Figures or any subsequent Figure(s). Of course, however, the user interface 420 may be implemented in any desired environment. The aforementioned definitions may apply during the present description.

As shown, the user interface 420 may be utilized to send a request to initiate a group associated with a location based social network. In one embodiment, the user interface may include a button 422 to initiate a new group for a location based social network. Further, in one embodiment, the user interface 420 may include one or more buttons 424 to add a group to an existing location based social network.

For example, in one embodiment, a location based social network may be in existence for a particular location, including a first group of users. Another user, which may be part of a second group of users, may desire to initiate a second location based social network group. Accordingly, the second user may press the button 424 on the interface 420 to initiate the second location based social network group. Additionally, in one embodiment, the button 422 may be associated with the first location based social network group and/or the second location based social network group, where selecting the 'new' group by itself, or with an existing button 424, will display FIG. 4C.

In one embodiment, the user interface 420 or the like may be presented to a user in response to the user capturing a photograph, video, or other type of media. In another embodiment, the user may have the ability to initiate a display of the user interface 420 (e.g., by selecting an icon, etc.). In yet another embodiment, the user interface 420 or the like may be initiated upon the user device entering a location (e.g., an establishment, a stadium, a vehicle, etc.). In still yet another embodiment, the user interface 420 or the like may be initiated upon the user device being within a proximity of a minimum predetermined number of one or more other third party devices (regardless of relationship with the user), a minimum predetermined number of one or more other third party devices that have a predefined relationship with the user, and/or a minimum predetermined number of one or more other third party devices that have share predefined preferences/settings for prompting social network creation. In one embodiment, an application including computer code for displaying the user interface 420 may be pushed to a mobile device upon entering the vicinity of a location and/or event, in a manner that is dictated by a manager or agent of the location/event.

The user interface 420 may include various functionality for initiating a user group and/or a location based social network. Further, in one embodiment, the user interface 420 may include one or more buttons to transfer media (e.g., a photo, a video, etc.) to another device, including, but not limited to, a device associated with the social network (e.g., a server, etc.).

In one embodiment, once the user initiates a new group, the user may be presented with information associated with the new group or information associated with the initiation of the new group. In one embodiment, the user may be presented with the information associated with the new via a user interface. For example, FIG. 4C shows a user interface that may be utilized to present information associated with the initiation and/or registration of a user group and/or a location based social network.

FIG. 4C shows a user interface 440 for registering a group associated with a location based social network, in accordance with one embodiment. As an option, the user interface 440 may be implemented in the context of the architecture and environment of the previous Figures or any subsequent Figure(s). Of course, however, the user interface 440 may be implemented in any desired environment. The aforementioned definitions may apply during the present description.

As shown, in one embodiment, the user interface 440 may be capable of presenting a user with information associated with the location of a new group associated with a location based social network, a timeframe associated with the new group associated with the location based social network, expiration criteria associated with the new group, as well as functionality for submitting a registration request.

In one embodiment, the user interface 440 may be automatically populated with location information associated with the location based social network. For example, in one embodiment, requestor device location information may be utilized to determine a location based social network and the location of that location based social network may be displayed. In another embodiment, the requestor may indicate a location of the desired location based social network group.

In yet another embodiment, the user may utilize a map to determine the location based social network group. For example, in one embodiment, the location of a requestor may be automatically determined and a map of an area around the requestor may be presented. In one embodiment, the requestor may have the ability to use the map to select a location for the location based social network group. For example, the requestor may be able to select an area on the map and/or a building shown on the map.

In another embodiment, the user interface 440 may offer the requestor the ability to add or modify expiration criteria for the location based social network group and/or add or modify expiration criteria for media associated with the location based social network group. Furthermore, in one embodiment, the user interface 440 may offer the requestor the ability to add or modify duration criteria associated with an event.

The user interface of FIG. 4C is one embodiment illustrating various functionality and information that may be presented to a user for registering a group. In various other embodiments, any additional information and functionality, in any combination, may be presented.

Once the location based social network group has been established (e.g., and the requestor is verified, etc.), or as part of the establishment of the location based social network group, in one embodiment, a manager of the social network or a group associated with the social network may be determined. The manager may be determined in a variety of ways. For example, in one embodiment, the manager may be determined to be the user who initiated the location based social network or the group associated with the social network. In another embodiment, the manager may be determined to be a user that selects to be manager (e.g., utilizing a user interface, etc.).

In another embodiment, the manager may be determined to be a user that is most active in the location based social network (e.g., based on publishing media to the social network, based on publishing comments to the social network, etc.). In another embodiment, the manager may be associated with the location (e.g., a business owner, a manger of a business, etc.). Of course, in various embodiments, any criteria may be utilized to determine the manger. For example, current members of the social network may have the ability to vote a new manager, etc. Once the manager of the location based social network is determined, the manager may have the ability to manage different aspects of the social network and/or groups associated therewith.

Figure 4E:
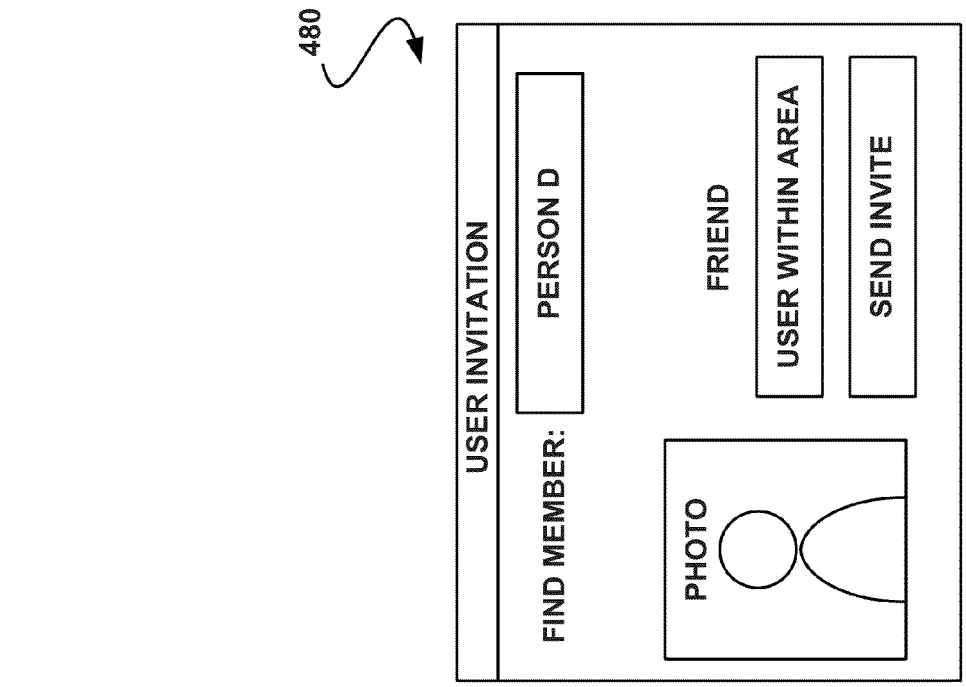
FIG. 4E shows a user interface for inviting a user to a location based social network or a group associated therewith, in accordance with one embodiment.
Figure 4D:
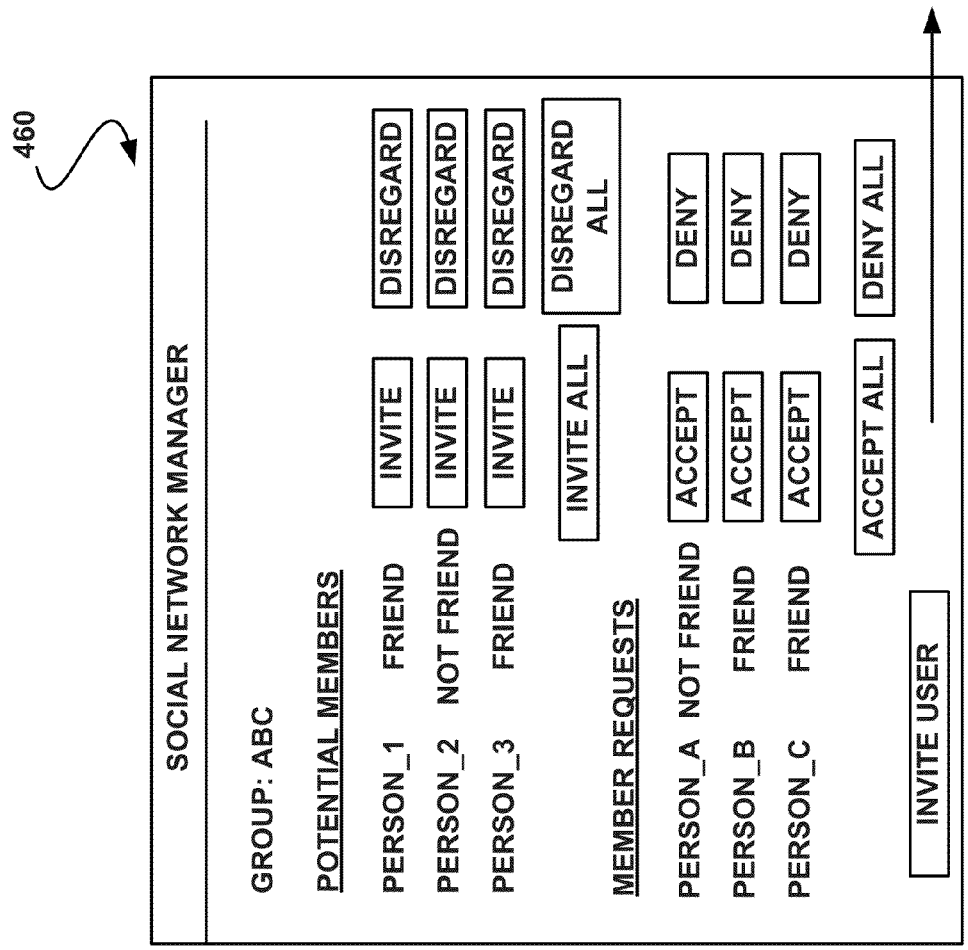
FIG. 4D shows a user interface for managing a location based social network or a group associated therewith, in accordance with one embodiment.

FIG. 4D shows a user interface 460 for managing a location based social network or a group associated therewith, in accordance with one embodiment. As an option, the user interface 460 may be implemented in the context of the architecture and environment of the previous Figures or any subsequent Figure(s). Of course, however, the user interface 460 may be implemented in any desired environment. The aforementioned definitions may apply during the present description.

As shown, the user interface 460 may be utilized to present the manager with various options for allowing user access to the location based social network, denying access to the location based social network, and inviting users to join the location based social network. In one embodiment, the user interface 460 may be utilized to present the manager with the option to blacklist a user or group of users from the social network or a group associated with the social network. In various embodiments, the blacklisting may be enforced until revoked, for a preset time period, for an indicated time period, until the user exits a location for a time period and reenters the location, and/or based on a variety of other criteria. In the context of the present description, blacklisting a user refers to any way of indicating a user is prohibited from using or accessing the social network or a group associated therewith.

In one embodiment, the user interface 460 may present the manager with users that are potential members. In one embodiment, the potential members may include users that are located within an area associated with the location based social network (e.g., within a specific boundary, etc.). In another embodiment, the potential members may include users that have previously been associated with a social network in the same or a similar location.

Additionally, in one embodiment, the user interface 460 may present the manager with user requests to join the location based social network group. In one embodiment, the member requests may include requests from users in a location associated with the location based social network. In one embodiment, the member requests may include member requests from one or more users that discovered the social network through a search. In one embodiment, the manager of the location based social network group may have the ability to invite one or more users to join the location based social network group.

While the user interface 460 is shown to include person-specific options, other embodiments are contemplated where entire groups may be invited or disregarded, etc. For example, all people who are "friends" or otherwise associated with the social network manager may be listed as single entry identified appropriately (e.g., "friends", "Group X," etc.).

In various embodiments, the user interface 460 may be configured by the social network manager. For example, potential members and requests may be filtered so that only friends are shown via the user interface 460. Even still, the user interface 460 may allow for an option to delegate any selected manager capabilities/duties to specific other persons (e.g., by sending invite to take on capabilities/duties, etc.) or allow for any other member or potential member to take responsibility (or even collaborate in such regard). To this end, embodiments are contemplated where no social network manager exists and the associated capabilities/duties disclosed herein are managed by the social network members themselves in a collaborative effort.

FIG. 4E shows a user interface 480 for inviting a user to a location based social network or a group associated therewith, in accordance with one embodiment. As an option, the user interface 480 may be implemented in the context of the architecture and environment of the previous Figures or any subsequent Figure(s). Of course, however, the user interface 480 may be implemented in any desired environment. The aforementioned definitions may apply during the present description.

As shown, the user interface 480 may be utilized to invite one or more users to join a location based social network or a group associated therewith. In one embodiment, the user interface may be utilized to search for specific users and invite such users to join the location based social network once found. In one embodiment, a filter may be utilized to present or return only users that are located within the area associated with the location based social network.

For example, in one embodiment, a manager may seek to invite a first user (e.g., using a search, etc.). In this example, if the first user is outside an area associated with the location based social network, the manager may be presented with an indicator that the first user is outside of the area. In various embodiments, this indicator may include a text indicator, a graphical indicator, or the inability to find the first user in a search. In one embodiment, the manager may have the ability to invite users to join that are outside of the area associated with the location based social network.

In one embodiment, the user interface 480 may present the manager with the ability to invite the user to join the social network by pressing an invitation button. In one embodiment, the recipient of the invitation may be required to accept the invitation to be added to the location based social network. In another embodiment, the recipient of the invitation may be added to the social network automatically upon sending of the invitation and/or other criteria. For example, the user interface 480 may be presented only after the user enters an area associated with the location based social network. In another embodiment, the user interface 480 may be presented before the user enters an area associated with the location based social network, but any invite may only be accepted after the user enters the area associated with the location based social network.

To this end, the invitation presented by the user interface 480 may be presented to any candidate member. Additionally, as previously noted, members may be identified utilizing a variety of techniques.

Figure 5:
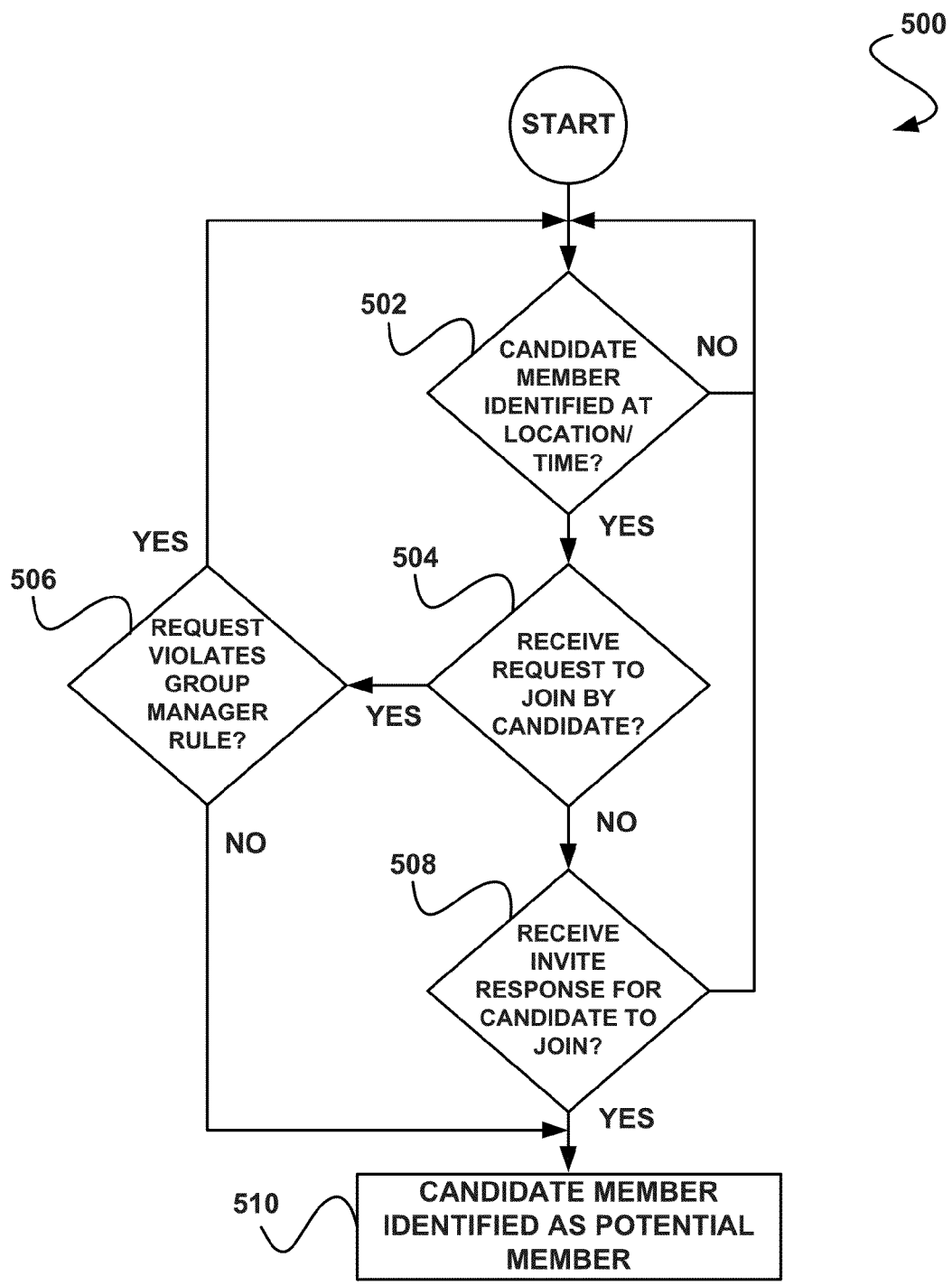
FIG. 5 shows a method for identifying candidates for a location based social network, in accordance with one embodiment.

FIG. 5 shows a method 500 for identifying candidates for a location based social network, in accordance with one embodiment. As an option, the method 500 may be implemented in the context of the architecture and environment of the previous Figures or any subsequent Figure(s). Of course, however, the method 500 may be carried out in any desired environment. It should also be noted that the aforementioned definitions may apply during the present description.

As shown, it is determined whether a candidate member is identified at a location associated with a location based social network. See determination 502. In the context of the present description, a candidate member refers to any user that may be a candidate for access to the location based social network or a group associated therewith.

For example, in one embodiment, the candidate member may include a user that is located within an area associated with the location based social network (e.g., within the boundaries of the location based social network, etc.). In another embodiment, the candidate member may include a user that is available within a predefined time period (e.g., a user in a location during a predefined time period, etc.).

The candidate member may be identified in a variety of ways. For example, in one embodiment, user devices associated with candidate members may be detected within an area associated with the location based social network. In various embodiments, the location of the user devices may be detected from a signal sent from the user device (e.g., initiated by an application stored on the user device, etc.).

In another embodiment, the location of candidate members may be determined by content published by the candidate members, a bar code scanned by the candidate members, a message sent by the candidate members, a request sent by the candidate member, and/or any other technique for detecting or locating the candidate members. In one embodiment, the candidate may respond to an invite, which may be utilized to determine the location of the candidate member.

In addition to determining whether a candidate member is identified at a location associated with the location based social network, it is determined whether a request to join the location based social network is received from a candidate. See determination 504. For example, a user within boundaries associated with the location based social network may identify the location based social network and send a request to join the social network or a group associated therewith.

In various embodiments, the request may be in different forms. For example, in one embodiment, the request may include an email request. In another embodiment, the request may include a text message request. In another embodiment, the request may include an online request. For example, in one embodiment, the request may be initiated by an online request interface associated with the location based social network.

In various embodiments, the request may include any information associated with the user, such as a name of the user, a friend status of the user, a location of the user (e.g., a GPS location, a building location, an address location, a seat location, etc.), an image of the user and/or location/event, an image for uploading by the user, text from the user, and/or any other information. In one embodiment, the information included in the request may be utilized, at least in part, to determine whether the request violates one or more group manager rules. See determination 506.

The group manager rules may include any rules established by a manager of the group associated with the social network. For example, in various embodiments, the rules may be based on the location of the user, a time associated with the request, the user identification (e.g., compared to a blacklist or whitelist, etc.), the number of existing users in the group, the identities of other users in the group, a rating of the requestor (e.g., a cordiality rating, etc.), and/or any other information.

In one embodiment, the rules may be automatically applied. In another embodiment, a group manager may enforce the rules. In the context of the present description, a group manager may refer to the manager of a group associated with the location based social network, a manager of the location based social network, or both.

The manager of the social network may be determined in various ways. For example, in one embodiment, the manager may be determined based on which profile initiated the location based social network. For example, a user associated with a profile may have initiated the location based social network and/or a group associated therewith. In one embodiment, the user associated with this profile may be determined to be the manager.

In another embodiment, the manager may be determined based a level of activity of a profile in connection with the social network. For example, in one embodiment, a user associated with the most active profile (e.g., based on uploads, comments, etc.) may be determined to be the manager. In another embodiment, the manager may be determined based on time. For example, a user that is associated with the social network of a group in the social network for the longest period of time may be determined to be the manager.

Furthermore, in one embodiment, a manager of the social network may be changed from an initial manager to a different manager, based on at least one criteria. For example, in one embodiment, the criteria may include a level of activity of the different manager in connection with the social network. As an option, the criteria may be controlled by the initial manager.

Further, in one embodiment, the location based social network, or a group associated therewith may not have a manager. For example, once the group is created, the group may be configured to operate without a manager or lead and may run based on the initial settings. Additionally, in one embodiment, all users associated with a whitelist may be automatically invited to join the location based social network or a group associated therewith. Similarly, in various embodiments, settings associated with the location based social network may include automatically inviting all users, invite only specified members, and/or inviting friends of an initiator, etc.

In one embodiment, the location based social network may be capable of including hidden groups that are joinable only if they are known to the user wishing to join (e.g., as in joining a hidden Wi-Fi network by plugging in the SSID of the Wi-Fi network, etc.). Furthermore, in yet another embodiment, the user may be prompted for a password (e.g., passcode, hash, shared secret, etc.) as an additional criteria for joining the location based social network.

In addition to determining whether a request to join has been received by a user, it is determined whether a response to an invite request is received. See determination 508. For example, in one embodiment, an invitation to join the location based social network or a group associated therewith may be sent to a candidate member. The candidate member may then respond to the invite such that the response to the invite is received.

If the candidate member does not violate any manager rule and/or the candidate member responds to an invite, the candidate member may be identified as a potential member. See operation 510. In one embodiment, once the candidate member is identified as a potential member, the member may be added to the social network or a group associated with social network.

Figure 6:
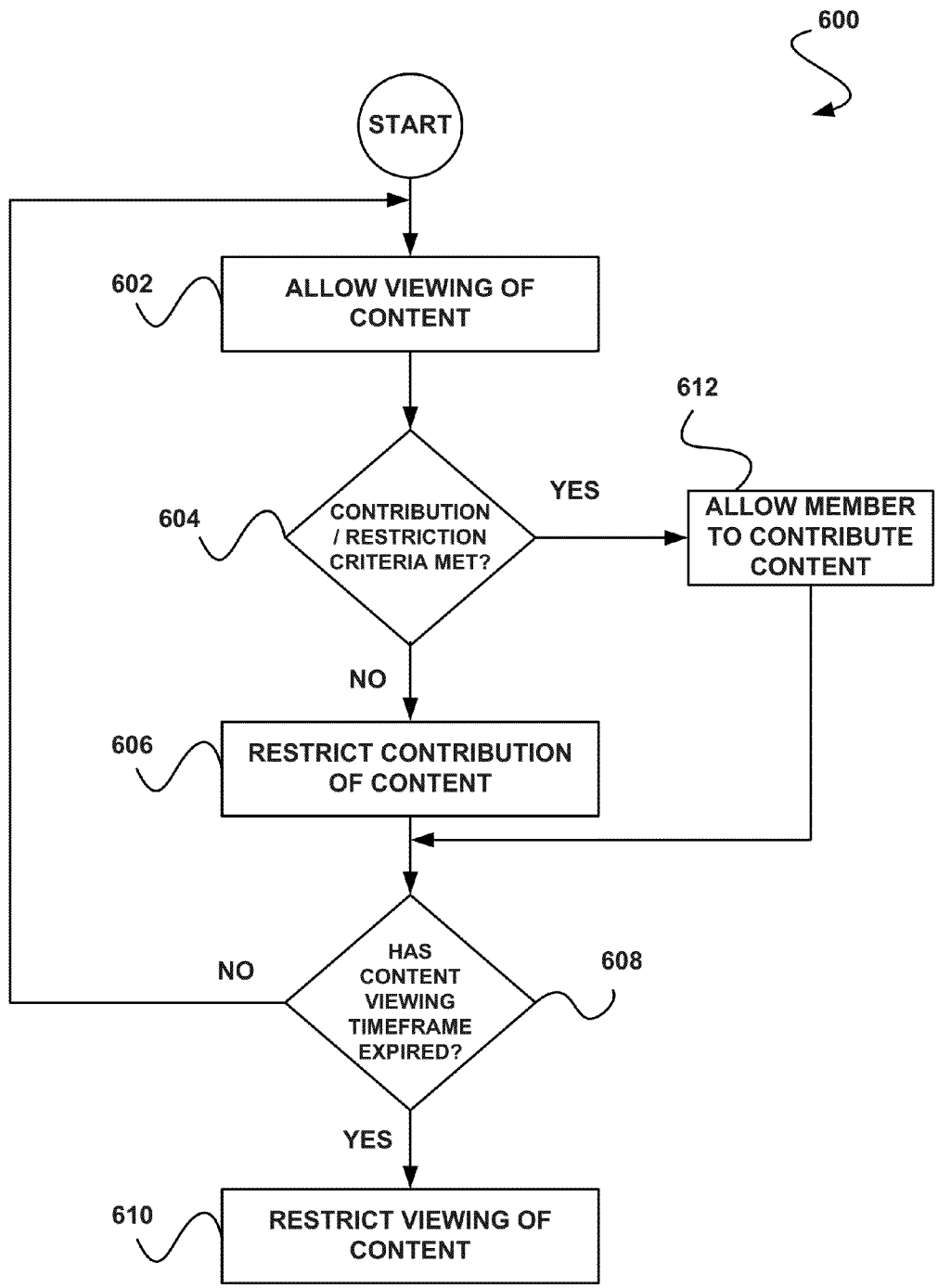
FIG. 6 shows a method for managing a location based social network, in accordance with one embodiment.

FIG. 6 shows a method 600 for managing a location based social network, in accordance with one embodiment. As an option, the method 600 may be implemented in the context of the architecture and environment of the previous Figures or any subsequent Figure(s). Of course, however, the method 600 may be carried out in any desired environment. It should also be noted that the aforementioned definitions may apply during the present description.

As shown, one or more members are allowed to view content associated with the location based social network. See operation 602. The content may include any content capable of being displayed or transferred utilizing a site associated with the location based social network. For example, in one embodiment, the content may include media that is posted on the website associated with the location based social network. In various embodiments, the media may include images, video, audio files, and/or any other type of media.

In the context of present description, a site may refer to a website, a location associated with the application, a database, a data store, a cache, and/or various other devices. For example, in one embodiment, the content may include content capable of being displayed or transferred utilizing a specialized app and associated backend connections with a frontend Web app that accesses the site via the website frontend.

In another embodiment, the content may include text posted on the site associated the location based social network. In various embodiments, the text may include comments, member information, group information, and/or any other text. In yet another embodiment, the content may include one or more advertisements. For example, advertisements associated with businesses and/or services in a location associated with the social network may be presented on the site and/or sent to a member in another way (e.g., via a text message, via an email, via a notification [e.g., associated with an application advertisement, an application badge update, etc.], etc.).

The members may be allowed to view the content utilizing a variety of techniques. For example, in one embodiment, all members of the location based social network may be allowed to view content associated with the social network. In another embodiment, all members of one or more groups included in the location based social network may be allowed to view content associated with the social network. In another embodiment, each member may have individual permissions allowing the member to view specified content, certain types of content, or all content, etc.

In one embodiment, a member may be prohibited from viewing content from certain members. For example, a first member may be allowed to view content posted from a second member but not content posted by a third member. In one embodiment, the member may be capable of setting content permissions for content posted by the member. In another embodiment, the manager may be capable of setting content permissions. In such manner, sub-groups may exist within the social network, with private conversations, interactions, sharing, etc. taking place within each of the sub-groups.

In one embodiment, the members may be capable of publishing content on the site associated with the location based social network. As an option, one or more rules may be utilized to determine whether the content may be published. Accordingly, it may be determined whether contribution criteria is met. See decision 604.

The contribution criteria may include any type of criteria for determining whether one or more members may publish content. For example, in one embodiment, a specific type of content may be restricted. In various embodiments, the specific type of content may include explicit content (e.g., explicit pictures, explicit text, explicit audio, etc.), content greater than a particular size, and/or any other a specific type of content.

In another embodiment, the contribution criteria may include time based criteria. For example, in one embodiment, the publishing of content or certain types of content may only be permitted during a specific time period or up until a specific time (e.g., until the end of a promotional event, until the end of a game, etc.). In one embodiment, members may have the ability to publish image content during an event (e.g., a game, etc.), however, the members may be restricted from publishing image content once the event has terminated. In another embodiment, the members may be restricted from publishing image content once the event has terminated, however, the members may have the ability to publish text content for at least a period of time after the event has terminated.

In another embodiment, the contribution criteria may be member specific. For example, in one embodiment, a first member may be allowed to publish text but may not be able to publish images and a second member may be allowed to publish text and images. In another embodiment, a member may have the ability to view the content, however, the member may not be able to publish content. In one embodiment, the manager of the location based social network may be capable of establishing the contribution criteria. In other embodiments, such member-related contribution criteria may include any profile information associated with the member. For example, a payment status of the member may govern whether the member may contribute content.

In another embodiment, the contribution criteria may be location specific. For example, in a situation where content (e.g., pictures, etc.) is geo-tagged, such tagging may be used to restrict contributions to include only that which is generated at the specific location. This may be helpful in ensuring that only location-relevant content is contributed.

If it is determined that the contribution criteria has been met, the member is allowed to contribute content. See operation 612. The member may contribute content in a variety of ways. For example, in one embodiment, the member may type text in an interface associated with the location based social network. In various other embodiments, the text may be contributed via a text message, an email, a voice to text, and/or any or text input technique.

In another embodiment, the member may contribute content by sending an image to the location based social network. In one embodiment, the sending of the image may include transmitting the image. In various embodiments, the transmitting may include uploading the image, pushing the image, and/or sending the image, etc.

In another embodiment, the sending of the image may include sending the image to a system associated with the location based social network via an instant message (e.g., utilizing an instant messaging application, a text message, an SMS, etc.). In another embodiment, the sending of the image may include sending the image to a system associated with the location based social network via an email.

In another embodiment, the member may contribute content by sending a file (e.g., an audio file, etc.) to the location based social network. In another embodiment, the member may contribute content by publishing a link (e.g., an application link, an html link to content, a non-html link, etc.).

If the contribution criteria is not met, the contribution of content from the member is restricted. See operation 606. In one embodiment, the member may receive an indication that the content contribution attempt was unsuccessful. For example, in one embodiment, text may be displayed that indicates the contribution attempt was unsuccessful. In another embodiment, the member may be presented with reasons why the content contribution attempt was unsuccessful (e.g., based on time criteria, based on explicit content criteria, etc.).

In addition to managing the publishing of content, it may be determined whether a content viewing time frame has expired. See decision 608. For example, content posted on a site associated with the location based social network may be associated with a specific time frame for viewing. In various embodiments, the time frame for viewing may include a manually determined time frame (e.g., by a manager, a member, etc.), an event driven time frame, a default time frame, and/or any other time frame.

In one embodiment, the member that contributed the content (e.g., an image, etc.) may have the ability to set an expiration time for the contributed content. In one embodiment, the member may be prompted to enter an expiration time when attempting to publish the content. In another embodiment, the member may have the ability to set a default expiration time for all content associated with the user. In various embodiments, the expiration time may include a specific time (e.g., X time on Y date, etc.), an expiration time based on an event (e.g., at the end of a game, etc.), an expiration time based on a group or social network status (e.g., when the last member associated with the group logs out, etc.), and/or any other expiration time.

Additionally, in one embodiment, a first type of content may have a different expiration time than a second type of content. For example, in one embodiment, images may be set to expire before text. Of course, in various embodiments, different expiration criteria and/or rules may be utilized (e.g., based on member preference, manager preference, etc.).

As noted, the content may include any type of content. In one embodiment, the content may include advertisements. The advertisements may include advertisements for products, services, establishments (e.g., restaurants, shops, etc.), and/or any advertisement. In one embodiment, the advertisements may include custom advertisements generated for location based social network groups.

If it is determined that the content viewing timeframe has expired, based on the expiration criteria, the viewing of the content is restricted. See operation 610. It should be noted that any of the criteria mentioned hereinabove in connection with content contribution restriction may or may not be employed in connection with content viewing, and visa-versa.

In one embodiment, restricting viewing of the content may include restricting member access to a particular site associated with the location based social network. In another embodiment, restricting viewing of the content may include removing the content from a site associated with the location based social network.

In another embodiment, restricting viewing of the content may include covering the content in some form (e.g., redacting, etc.). In another embodiment, restricting the viewing of the content may include deleting the content from a system associated with the location based social network. For example, in one embodiment, once the content expires, the content may automatically be deleted from storage associated with the location based social network such that republishing the content would require resending the content to the location based social network.

In another embodiment, restricting viewing of the content may include moving the content to a location in storage associated with non-published content. In another embodiment, restricting viewing of the content may include moving the content to a folder associated with the member. In another embodiment, restricting the viewing may include redirecting a member from a website including the content to a website without the content.

In various embodiments, the ability to move content may be done on a user-by-user basis for archival purposes. For instance, the user may request or be prompted to add all or a select subset of content associated with an expiring location/time-based social network to their personal profile page for more permanent viewing.

Still yet, if the location/time-based social network was prominent enough to warrant further proliferation of networking (independent of the location/time) among the members, an option may be provided to initiate a more permanent location/time-independent "group" social network. This may occur in connection with a location/time that was monumental to the social network members, so as to warrant further networking.

In another embodiment, content of the location/time-based social network may be indexed or otherwise made available, to allow for non-members who may have heard about an event to search for content posted by members of the expired social network. Of course, in various embodiments, any number of techniques may be utilized to restrict viewing of the content so as to stay true to the location/time-specific nature of the social network, but still allow for subsequent access to the relevant content and members, etc.

Figure 7:
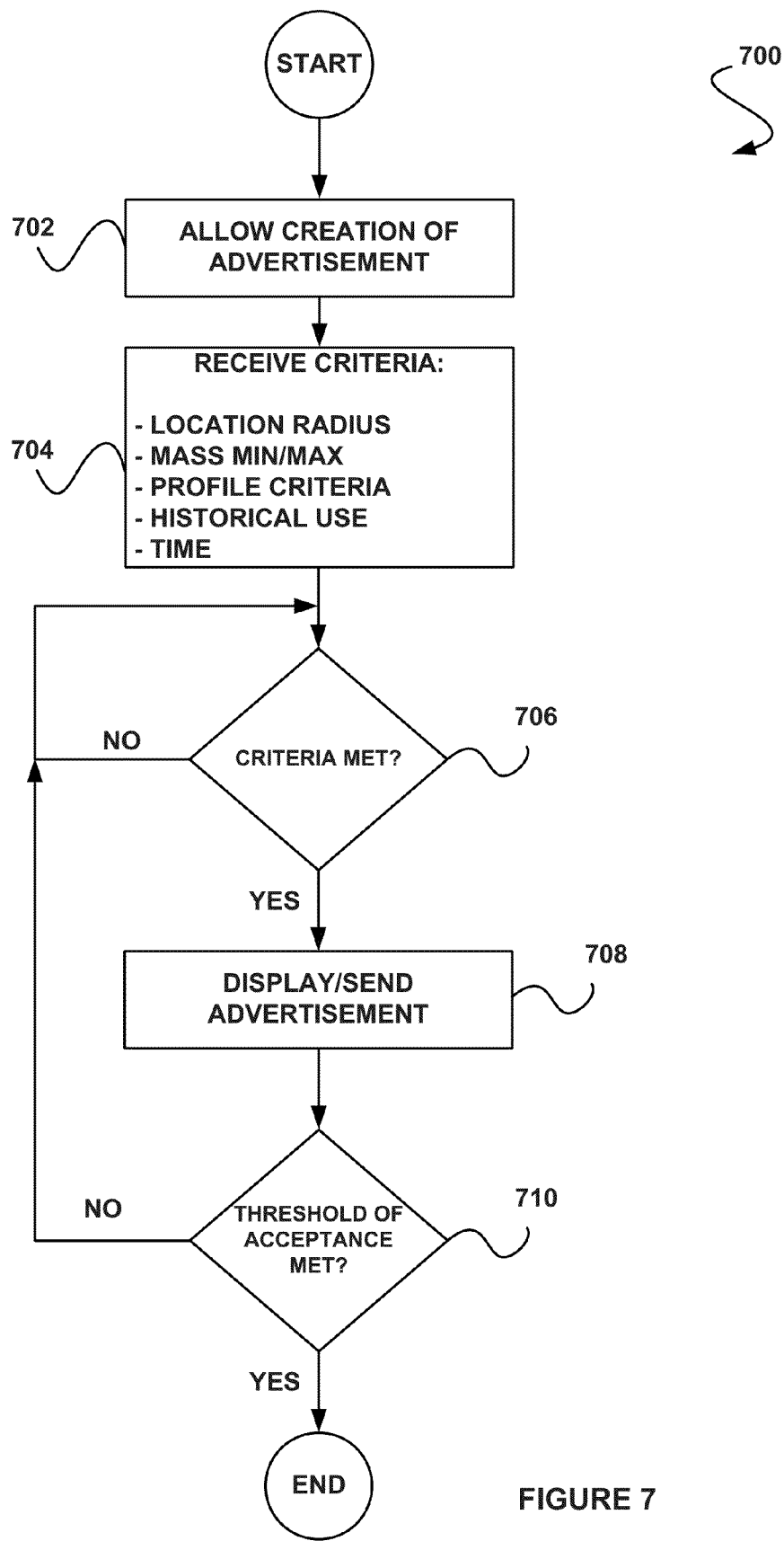
FIG. 7 shows a method for presenting an advertisement to a location based social network group, in accordance with one embodiment.

FIG. 7 shows a method 700 for presenting an advertisement to a location based social network group, in accordance with one embodiment. As an option, the method 700 may be implemented in the context of the architecture and environment of the previous Figures or any subsequent Figure(s). Of course, however, the method 700 may be carried out in any desired environment. It should also be noted that the aforementioned definitions may apply during the present description.

As shown, creation of one or more advertisements is allowed. See operation 702. The advertisements may include any type of advertisement and/or promotional material. In one embodiment, the advertisement may include one or more coupons.

In one embodiment, the advertisements may be created or selected based on information associated with a location based social network group. For example, in various embodiments, target advertisements may be created based on an event associated with a location based group, member profile information (e.g., age, sex, education, hometown, etc.), content associated with the location based group, a time associated with the location based group, a location associated with the location based group, and/or any other information. In another embodiment, the advertisements may be included in an advertisement database. As an option, the advertisements may be presented or displayed when predefined criteria is met.

For example, in one embodiment, criteria associated with the location based social network group may be received. See operation 704. The criteria associated with the location based social network may be based on any information, such as a location radius (e.g., boundaries associated with the location based social network group, etc.), an amount of members/attendees (e.g., a mass max/min, etc.), profile criteria, time, member history, group history, and/or various other criteria.

In one embodiment, the criteria may be used to determine whether to display an advertisement on a website associated with the location based social network and/or send an advertisement to one or more members. For example, in one embodiment, the criteria may include requiring that the location radius include a particular business associated with an advertisement. In one embodiment where a business is a chain or group of multiple disparate locations, operation 704 may accommodate the same by allowing for multiple locations (and radiuses) in connection with a single advertisement campaign.

In another embodiment, the criteria may include requiring that the location based social network include a certain amount of members (e.g., 5, 10, 15, 20, etc.), a minimum amount of members (e.g., 5, 10, 15, 20, etc.), and/or a maximum amount of members (e.g., 5, 10, 15, 20, etc.). In the aforementioned embodiment where a business is a chain or inclusive of multiple disparate locations, the above minimum/maximum criteria may be established on a location-by-location basis (e.g., X number per location, X number at location X and Y number at location Y, etc.) or on an aggregate basis (e.g., X number across all locations).

In another embodiment, the criteria may include requiring that the location based social network be active during a specific time period. In the aforementioned embodiment where a business is a chain or inclusive of multiple disparate locations, the specific time period may be configured to accommodate different time zones, etc.

In yet another embodiment, the criteria may include requiring that one or more members associated with the location based social network group have previously attended a business associated with the advertisement. In still another embodiment, the criteria may include requiring that at least one member of location based social network group is of a particular gender or age bracket (e.g., based on the member profile, etc.). Of course, in various other embodiments, the criteria may include a variety of rules. In one embodiment, the criteria and/or rules may be defined by an advertisement manager. In another embodiment, the criteria and/or rules may be defined by the manager of the location based social network.

Based on the criteria, it may be determined whether the criteria is met. See decision 706. If the criteria is met, the advertisement is displayed and/or presented to one or more members associated with the location based social network. See operation 708.

For example, in one embodiment, the advertisement may be displayed on a website associated with the location based social network. In one embodiment, the advertisement may be displayed in an advertisement section of the website associated with the location based social network. In another embodiment, the advertisement may include a pop-up advertisement.

As another example, in one embodiment, the advertisement may be sent to one or more of the members. For example, in various embodiments, the advertisement may be sent to the members via a text message (e.g., an SMS message, an MMS message, etc.), an email, an instant message, a message presented via a social network communication interface, and/or various other techniques.

The advertisement may include any material including text and/or images. In one embodiment, the advertisement may include a promotional code. In another embodiment, the advertisement may include information associated with a specific member. In various embodiments, the information may include a member name, a profile picture, gender information, and/or any other information.

In one embodiment, the member may be presented with an option to acknowledge receipt of the advertisement (e.g., utilizing a GUI button on the advertisement, etc.). In another embodiment, the acknowledgement of receipt of the advertisement may occur automatically. In another embodiment, the member may have the ability to indicate that the member plans to respond to the advertisement (e.g., by visiting an establishment, utilizing a coupon or promotional code, etc.).

In yet another embodiment, it may be automatically determined whether a member has responded to an advertisement. For example, an advertisement may be presented to a member for an establishment (e.g., a bar, etc.) outside of a stadium where the member is located. Upon entering the establishment after the game, an application on a mobile device of the user may cause information associated with the advertisement (e.g., a promotional code, etc.) to be sent to a system associated with the establishment, thus indicating the arrival of the member and a response to the advertisement. In another embodiment, the member may scan an advertisement upon entering the establishment to indicate a response to the advertisement.

Once the members have accepted the advertisement (e.g., by attending an establishment, purchasing an item, purchasing a service, etc.), it is determined whether any threshold of acceptance is met. See determination 710. For example, in one embodiment, a promotion associated with an advertisement may only be effective if a minimum amount of members are involved. In this case, it will be determined whether the minimum number of members have accepted the advertisement and whether to implement the promotion.

As an example, an establishment may present an advertisement to a member of a location based social network group that indicates the group will receive half priced drinks if at least ten members of the group attend the establishment after an event. In this case, if at least ten members attend the event, the promotion may be initiated. The determination that the members attended the establishment may be made automatically (e.g., utilizing an application on a mobile device, etc.) or manually (e.g., by checking-in manually, utilizing a promotional code, utilizing a bar code, etc.).

Figure 8A:
FIG. 8A shows a user interface for criteria selection associated with presenting an advertisement to a location based social network group, in accordance with one embodiment.

FIG. 8A shows a user interface 800 for criteria selection associated with presenting an advertisement to a location based social network group, in accordance with one embodiment. As an option, the user interface 800 may be implemented in the context of the architecture and environment of the previous Figures or any subsequent Figure(s). Of course, however, the user interface 800 may be implemented in any desired environment. It should also be noted that the aforementioned definitions may apply during the present description.

As shown, by utilizing the interface 800, an advertiser may have the ability to edit and/or select criteria for presenting an advertisement to a location based social network. The criteria associated with the location based social network may be based on any information, such as a location radius (e.g., boundaries associated with the location based social network group, etc.), an amount of members/attendees (e.g., a mass max/min, etc.), profile criteria, time, member history, group history, and/or various other criteria.

In various embodiments, the criteria may include requiring that the location radius include a particular business associated with an advertisement, that the location based social network include a certain amount of members, that the location based social network be active during a specific time period, that one or more members associated with the location based social network group have previously attended a business associated with the advertisement, that at least one member of location based social network group is of a particular gender or age bracket, and/or other criteria.

FIG. 8B shows a user interface 820 for advertisement reporting associated with presenting an advertisement to a location based social network group, in accordance with one embodiment. As an option, the user interface 820 may be implemented in the context of the architecture and environment of the previous Figures or any subsequent Figure(s). Of course, however, the user interface 820 may be implemented in any desired environment. It should also be noted that the aforementioned definitions may apply during the present description.

As shown, the user interface 820 may be utilized to display statistics, criteria application results, and/or other information associated with advertisements that may be presented to one or more members of the location based social network. In one embodiment, the user interface 820 may be customizable such that an advertiser may cause the display of desired fields on the advertisement report. Accordingly, the user interface 820 may be capable of reporting a variety of advertisement related information.

Figure 9:
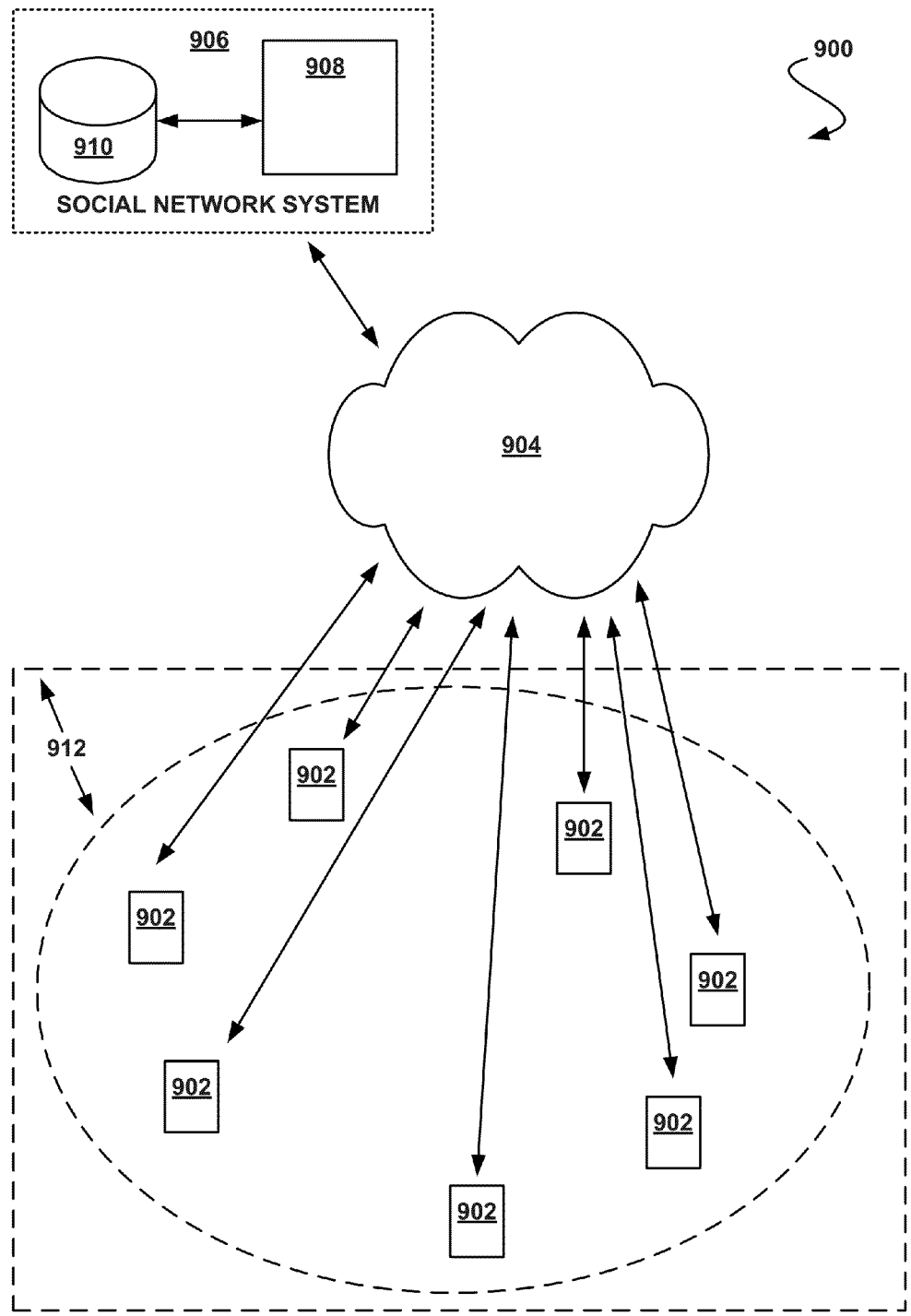
FIG. 9 shows a system for managing a location based social network, in accordance with one embodiment.

FIG. 9 shows a system 900 for managing a location based social network, in accordance with one embodiment. As an option, the system 900 may be implemented in the context of the architecture and environment of the previous Figures or any subsequent Figure(s). Of course, however, the system 900 may be implemented in any desired environment. It should also be noted that the aforementioned definitions may apply during the present description.

As shown, a plurality of user devices 902 may be utilized to communicate with a social network system 906 over one or more networks 904. In one embodiment, the social network system 906 may represent at least one server and may include various hardware devices, including one or more processors 908 and storage 910. Furthermore, the social network system 906 may include various software and computer programs.

The user devices 902 may include any number of user devices including computers, mobile phones, PDAs, and/or any other device capable of communicating over the network 904. In operation, users of the user devices 902 may be members of a location based social network hosted by the social network system 906. In one embodiment, one or more geographical boundaries 912 may represent a geographical boundary of the location based social network. In one embodiment, the users of the user devices 902 located within one of the geographical boundaries 912 may have the ability to join the location based social network. Additionally, in one embodiment, the ability of the users to become members may be based on a variety of other criteria.

Furthermore, in one embodiment, the location based social network may also be time based. For example, in one embodiment, the location based social network may be operational during a specific time period. Still yet, in one embodiment, content uploaded or sent to the social network system 906 by the user devices 902 may have expiration times and/or dates associated therewith. For example, in one embodiment, content uploaded to the social network system 906 may expire when an event associated with the location based social network ends.

In one embodiment, the system 900 and/or components associated therewith may be utilized to implement a social network based on location, time, and expiration permissions. For example, a group of users may gather at a particular location around a particular time. In one embodiment, media uploaded to a website associated with the group may be designated to the group until the gathering ends (e.g., no more submissions after a time period, etc.).

Additionally, in one embodiment, the media may be set to expire after a particular time period. For example, a gathering may persist for a week. In one embodiment, the media may be set to expire at the end of the week. In another embodiment, a default predefined time period may be utilized to indicate the expiration of the media. As an option, a group manager may extend the time period. This allows users of the location based social network group to utilize (e.g., view, update, etc.) the media for a period of time until the media expires, which prevents a long media history for each user. In this way, a social network that is based on geography, region, and/or a time of an event may be implemented. For example, users of the user devices 902 may become members in a social network that is based on location and time.

In one embodiment, a user may be verified by associating the user with a known identifier. For example, information from an SMS text message may be associated with a phone (e.g., to tie an identity to a phone number, etc.). Furthermore, in one embodiment, the user may be verified on an interval. For example, if a predefined number of intervals pass without verification from a user, the user may be shown to be inactive on a website associated with location based social network. In various other embodiments, a lack of verification from the user may cause a profile associated with the user to be deleted or marked as inactive and/or media associated with the group to be hidden.

In one embodiment, an owner of a group may have the ability to indicate which users cannot view the media. As an option, a default may be that all users are able to view the media. In one embodiment, the group manager may be delegated the task of indicating users that cannot view the media or the location based social website in order to make it necessary for the group manager to actively view the group website to ensure only the users the manager wants viewing the website are capable of viewing the website. In one embodiment, a website associated with the location based social network may be capable of showing all users who have viewed the website (e.g., within a number of hours, since the beginning, currently, etc.).

In one embodiment, one or more location based groups may be part of the location based social network. Additionally, in one embodiment, the groups may be based on a location (e.g., a specific or a super location, etc.) and a time. In various embodiments, the location may be determined using coordinates, landmarks, locations, streets, addresses, or any geo-location related info. In one embodiment, if coordinates are utilized, the location may be made more general by removing precision from the coordinates (e.g., by incorporating a certain radius around the coordinate, etc.). As an example of broadening the precision of coordinates, the coordinates 38.985202, −77.094669 may be broadened to 38.985, −77.094, which encompasses a larger area than the precise location.

Further, in one embodiment, the coordinates may indicate coordinate edge (e.g., 77.00000, 38.00000). In this case, broadening via removing precision may not accomplish the desired change. Accordingly, in one embodiment, the coordinates may be modified to change precision by adding or subtracting a precision value factor from the coordinates (e.g., 77.50, 38.25+/−1.0, 1.0, etc.). In various embodiments, the precision value factor may be manager definable, based on mass, and/or based on any other criteria.

In one embodiment, a super location may be defined in terms of geography (e.g., a street, a zip code, a city, a town, a state, a country, a continent, etc.). Additionally, in one embodiment, there may be multiple super geographies, each covering a different aspect of a precise location.

Furthermore, any of the groups may be based on a time component. In various embodiments, the time component of the group may include a time since the group or the social network website was created, a time since the group or the social network website was updated, a time since the group or the social network website was viewed, an absolute time, or a time to relative to another time, etc. In various embodiments, the group may be based on a location, distance from a location (e.g., some precision such as feet, miles, etc.), and/or various other criteria.

The group manager may be determined in a variety of ways. For example, in one embodiment, the owner of the group may initially be the first user to create a group at a location. In another embodiment, the owner of a group may include a user with the most mass associated with a location. In various embodiments, the mass may be determined by relationships, updates, posts, and visits, associated with the location group.

In one embodiment, the group manager position may change to another user if that user exceeds the mass of the current manager. In one embodiment, notifications may be presented to past and/or previous managers and/or users to indicate management changes.

In one embodiment, users may only subscribe to a group by visiting the location associated with the group (e.g., house, restaurant, city, country, etc.). Additionally, in one embodiment, users may indicate relationships such as friend, foe, and neutral to other users. In another embodiment, friends or foes of users and associated relationships may be indicated based on the relationships between users (e.g., a friend of a foe is a foe, a foe of a foe is friendly/neutral, etc.). In one embodiment, one or more conflict rules may be implemented. For example, conflicts where two friends have a conflict may be determined to be a neutral result. Conflicts where friend 1 has person A as foe, and friend 2 has person A as friend, may be determined to be a neutral result. Also, in one embodiment, a user may indicate a friend that takes precedence over another friend (e.g., the user may trust friend 1 relations more than friend 2 so use friend 1 for conflict resolution, etc.). Further, based on interconnections, person A may be regarded by those in a majority of the group as a friend/foe so that majority opinion is used.

The users may have the ability to upload media (e.g., text, images, video, audio, messages, metadata, any sort of data associated with a group, etc.) to the social network system 906. In one embodiment, the media may be uploaded to the social network system 906 and auto tagged to a group with location data. For example, everyone at a location (e.g., a gathering, etc.) may be members of a same group based on location, without a specific group invite (e.g., a dynamic group based on location, etc.).

In one embodiment, if the manager of the group is not friends (e.g., a foe, etc.) with another user at the same location, then that foe user may not see media associated with the group. In one embodiment, the foe user may see self-owned media, but may not be able to see media associated with the location. As an example, a picture uploaded by a foe may have additional messages attached that are hidden from the foe. However, neutral users or friends at a location may be able to see all media associated with the location group.

In one embodiment, users may control their own media but may not be able to see foe tags, etc., associated with the media. For example, a first user may upload an image such that members of the group may post comments. In one embodiment, the first user may have the ability to see all comments and the image but may not have the ability to see comments made by the foe. In one embodiment, any content posted by a location/time-based social network may not only be accessible to one or members of such location/time-based social network, but may also be accessible via the personal profile page (e.g., personal bulletin board, etc.) of the user.

In the context of the present description, a foe refers to any user that has been determined to not be a friend or neutral user. For example, in one embodiment, a first user may tag a second user as a foe of the first user. In one embodiment, the first user may be the only user to know that the second user has been tagged as a foe (e.g., and perhaps the manager, etc.). In another embodiment, all users will have the ability to view friend, foe, and neutral status of a user.

In one embodiment, uploaded media may be auto tagged with location information, metadata, a source identifier (e.g., phone number, user identifier), and various other information. In various embodiments, the media may be uploaded via SMS, email, text, and/or any other communication technique or network capable of communicating data. In one embodiment, the media may be tagged at the social network system 906 with information associated with the user (e.g., checked-in location, other profile info, metadata, etc.).

In one embodiment, users within the boundaries of the location based social network may be invited based on an identifier. For example, a user may send an invite to another user via message to their mobile phone. In various embodiments, the message may include an invite code, an application, instructions, or a confirmation link, etc.

In one embodiment, the user may have a public alias that is associated with their unique identifier. This may help tie each user to a more personal device such as a cell phone to combat fake profiles, and users, etc. Also, in one embodiment, users may invite other users based on relationships in existing social networks or contact lists. For example, a user may send invites to contacts in an email address book, an email inbox, a SMS history list, another social network, etc.

In various embodiments, an application associated with the location based social network may be running and updating to the server associated with the social network system 906 continuously, on an interval, at a boundary, or at a location, etc. In one embodiment, when a user encounters at least one other user (e.g., 2+ users in same location, etc.), a message may be communicated to friends in the location. For example, friend A of user B may enter a location where user B is checked in so user B may receive a notification that friend A arrived and/or friend A may receive a notification that user B is checked into the location. If the users are not friends, notifications may be sent based on group similarity, statistics, preferences, and relationships, etc. Furthermore, in one embodiment, notifications may be based on foe status. As an example, foe A of user B may enter a location where user B is checked in so user B may receive a notification that foe A arrived. Furthermore, as another example, if user B checks into a location where foe A is already checked in, user B may receive a notification that foe A is checked in at the location.

In one embodiment, a user mass may indicate the size of a group. For example, a single user at a location group may indicate the group has a small mass. However, a large number of users at a location group may indicate the group has a larger mass. In one embodiment, group mass information may indicate the size of the location. As an option, groups may merge with other groups of a similar location and of a smaller mass.

As an example, a first group of users may be at a stadium and may start a first location based group. Subsequently, or coincidentally, a second group of users may be at the stadium and start a second location based group. At some point during the game, the first group may determine to merge with the second group and the second group may accept the merger request. In one embodiment, the merger may include a mandatory merger (e.g., based on membership numbers, etc.). In another embodiment, private non-merging groups of existing friends may also exist. In yet another embodiment, the groups may, at least initially, be governed by a team with which the group members are affiliated (e.g., fans, etc.).

In one embodiment, the group may persist for a time period after the group is created. In this way, users at the stadium may have the ability to view media from other users at the same event. In the case that a time component was not associated with the location based website, the users may see media from previous events that are unrelated.

In one embodiment, the user mass may be utilized to indicate how big the location is for the group. Additionally, the user mass may represent a metric of participants in the group, an amount of media uploads in the group, and/or various other information.

In one embodiment, boundaries associated with the location based social network may be associated with the user mass. For example, if the location based group has a small user mass, the location diameter may be smaller. On the other hand, if the location based group has a large user mass, then the diameter may be bigger. In one embodiment, the diameter of the boundaries associated with the location based group may grow as more users are added, thus allowing more users to join. Additionally, in one embodiment, user mass may include a historical location mass as well, since users may differ based on time (e.g., many users to a stadium, few to a single house, etc.).

In one embodiment, advertisements may be targeted to a user based on location mass and participating businesses within or near the location of the group. For example, user A may have participated in location based group B at location C at time D. Based on this information, restaurant E may send user A a notification informing them of an offer E prior to a next event at location C.

In order to join a group, a user may be required to check-in, upload, or somehow participate in the location group at the location. In one embodiment, the user may allow other users to view the group after the event for the duration of the group. Furthermore, as an option a group manger may prohibit friend sharing for a group.

In one embodiment, if there are enough friend connected users in the group (e.g., mass of friends in a group exceeds non-friends, etc.), the group manager may indicate the group is private while the friends of the manager are greater than non-friends of the manager. For example, the planner of the event may have more friends in the location group than a participant of the group and may therefore exclude non-friends (e.g., neutral and/or foe users, etc.) from the location group.

In one embodiment, if the unconnected mass is far greater than connected mass (e.g., greater than double, triple, etc.), then the location group may be determined to be public. For example, an event at a stadium may have small groups of connected friends that are greatly outnumbered by the number of people at the event (e.g., a group of five friends vs. thirty thousand people at the event, etc.). In this case, the group may automatically be made a public group (e.g., until a certain number of users join, etc.). Even if the group is becomes/remains private, the public group (which may or may not be inclusive of the private group) may co-exist with the private group.

In one embodiment, all media may have tags associated with it. For example, in various embodiments, the media tags may include information such as media type, an uploader ID (e.g., an ID of the user who uploaded the media), a media ID, a time uploaded, a time modified, a time updated, an expiration time, a location/geo ID, and exchangeable image file (exit) information, etc. In addition, any media may be tagged by the social network members with descriptive content (e.g., names, comments, etc. in connection with people/places/things, etc.). In one embodiment, media tags may be searched by any tag, information, or parameter, etc., associated with the media.

As an example implementation in accordance with one embodiment, a first user may upload a first photo at a location. Since this photo is the first for this location group and time, the user may be defined the manager of the group. As additional users upload media to the location group, the mass of the group will grow. After each upload, it may be determined whether the manager is still the manager or if the management of group should be passed to another user. In one embodiment, to prevent bulk uploads of junk media to a group to claim manager status, other users of the location group may vote down media to eliminate any junk media from the group and management calculations.

In one embodiment, group votes may be counted based on relationship status between a media owner and voter. For example, if a first user uploads media, a vote from a foe or friend may carry less weight than a vote from a neutral user. Additionally, in one embodiment, the media may be ranked on total positive and negative votes. In one embodiment, the social network system 906 may provide additional ranking based on a number of uploads per unit time, or previous aggregate rankings of uploads for a user, etc.

In one embodiment, if an uploaded item is well liked by other users of the group, it will rank higher than unranked or poorly ranked media. As an option, a manager of the group may be determined based on a total rank of all media for each user in the group. For example, two well ranked media uploads may be better than five unranked uploads or ten poorly ranked uploads.

In various embodiments, the growth rate of a location group may be based on a number of factors, including a number of users in the location group, or a growth rate (e.g., linear or exponential, etc.), etc. In one embodiment, a diameter of the location group may be based on an aspect of the group (e.g., size of the group, location of the group, etc.).

In one embodiment, when a user uploads media, groups covering a location associated with the user may be checked and presented to the user so the user can decide which group to join. In one embodiment, after joining a group at a location, the media may be automatically associated with that group until the user moves to a new location outside of the location group or if a predetermined amount of time passes (e.g., between an initial join, a last media upload, etc.). In one embodiment, if a group is already known or previously joined by a user, the user may indicate to auto-join the group.

Further, in one embodiment, a user may set a preference/order of groups to join. For example, if a user has joined four groups that cover a location (e.g., a home, city, state, country, etc.), then the user may be able to dictate the order of joining. Also, in one embodiment, media may be submitted to multiple overlapping groups at once. As an example, a user may submit to both a home and city group at same time.

Figure 10:
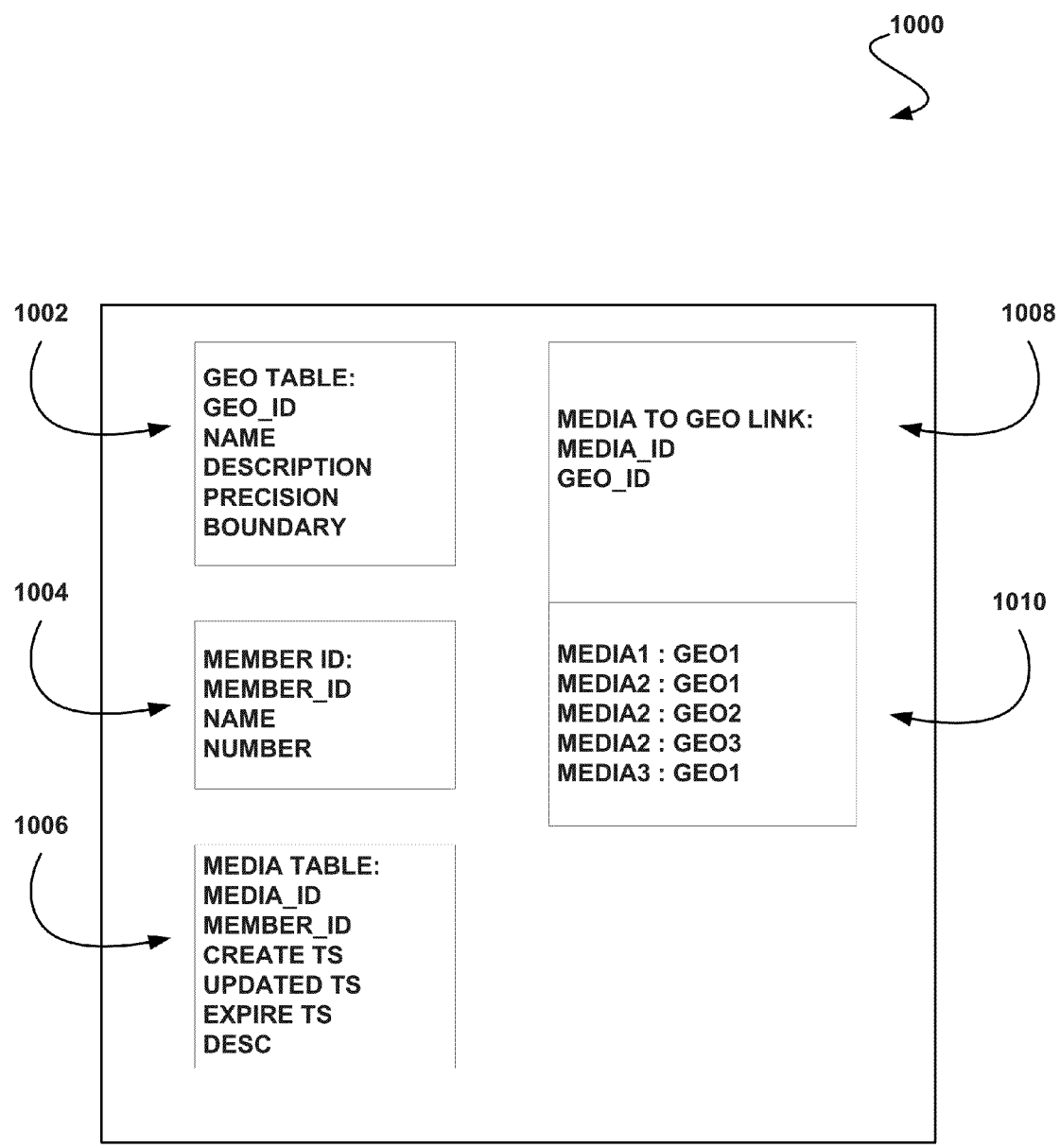
FIG. 10 shows a database storage system illustrating a geo social network structure, in accordance with one embodiment.

FIG. 10 shows a database storage system 1000 illustrating a geo social network structure, in accordance with one embodiment. As an option, the system 1000 may be implemented in the context of the architecture and environment of the previous Figures or any subsequent Figure(s). Of course, however, the system 1000 may be implemented in any desired environment. It should also be noted that the aforementioned definitions may apply during the present description.

As shown, the database storage system 1000 may include database structures associated with the location based social network (i.e., the geo social network, etc.), information associated with one or members, information associated with a group, and/or information associated with the media. For example, in one embodiment, a geo table 1002 may be stored. The geo table 1002 may include any information associated with the location of the location based social network and/or a group associated therewith.

For example, in one embodiment, a "GEO_ID" tag may be utilized to indicate a unique ID for the location. Additionally, a "NAME" tag may be utilized to indicate a name of the location associated with the location based social network (e.g., the name of a building, city, etc.). In various embodiments, the "NAME" tag may be automatically defined or defined by a user.

Further, in one embodiment, a "DESCRIPTION" tag may be utilized to indicate a description of the location based social network. The "DESCRIPTION" tag may include any information associated with the location based social network such as a general description of the location (e.g., "This location is a bar style restaurant that serves appetizers and drinks," etc.), a seating capacity, hours of operation, dress code, and/or various other description information.

Still yet, in one embodiment, a "PRECISION" tag may be utilized to indicate a precision associated with the location. For example, the "PRECISION" tag may indicate that the precision of the location is a point, a town, a city, within 1 m, 10 m, 100 m, etc. In another embodiment, a "BOUNDARY" tag may be utilized to indicate a boundary associated with the location based social network. For example, in various embodiments, the "BOUNDARY" tag may include coordinates associated with the boundary, a pointer to a boundary description, a zip code, and/or other information. In one embodiment, the "BOUNDARY" tag may include or reference a non-uniform boundary (e.g., a defined perimeter around a location, etc.).

In another embodiment, a member identification table 1004 may be provided. In one embodiment, the member identification table 1004 may include a "MEMBER_ID" tag. In one embodiment, the "MEMBER_ID" tag may be utilized to indicate a unique ID for a member. In various embodiments, the unique ID may include any type of identifier including a user name, an ID number, and/or any other identifying information.

In one embodiment, a "NAME" tag may be utilized to indicate a name of a member. For example, the "NAME" tag may include the first, last, and possibly middle name of the member. In another embodiment, a "NUMBER" tag may be utilized to indicate a phone number of a member. For example, the "NUMBER" tag may be utilized to indicate a mobile phone number of the member.

In another embodiment, a media table 1006 may be provided. In one embodiment, the media table 1006 may include a "MEDIA_ID" tag utilized to indicate a unique ID for the media. For example, in one embodiment, the "MEDIA_ID" tag may include a unique name associated with the media, a unique number associated with the media, a unique time associated with the media, and/or any other information capable of being utilized to indicate a unique ID for the media.

In one embodiment, a "MEMBER_ID" tag may be utilized to indicate an owner or provider (e.g., a person who uploads the media, etc.) of the media. For example, the "MEMBER_ID" tag may include a unique ID of a member or a name of a member. Additionally, in one embodiment, a "CREATE TS" tag may be utilized to indicate a time and/or date that the media was created.

In another embodiment, an "UPDATED TS" tag may be utilized to indicate a time and/or date the media was updated. In another, embodiment, an "EXPIRE TS" tag may be utilized to indicate a time and/or date the media expires. In various embodiments, the "EXPIRE TS" tag may be determined automatically or manually. Furthermore, in one embodiment, a "DESC" tag may be utilized to indicate a description of the media.

In another embodiment, a media to geo link table 1008 may be provided. In one embodiment, the geo link table 1008 may include a "MEDIA_ID" tag utilized to indentify the media. In another embodiment, a "GEO_ID" tag may be provided for indicating the unique ID for the location. Table 1010 shows an exemplary implementation illustrating a media item "MEDIA1" being linked to a location "GEO1"; a media item "MEDIA 2" being linked to the location "GEO1", a location "GEO2", and a location "GEO3"; and a media item "MEDIA3" being linked to the location "GEO1."

Of course, in various other embodiments, any information and/or tables may be provided. Furthermore, linking data between tables may be accomplished in any number of ways.

Figure 11:
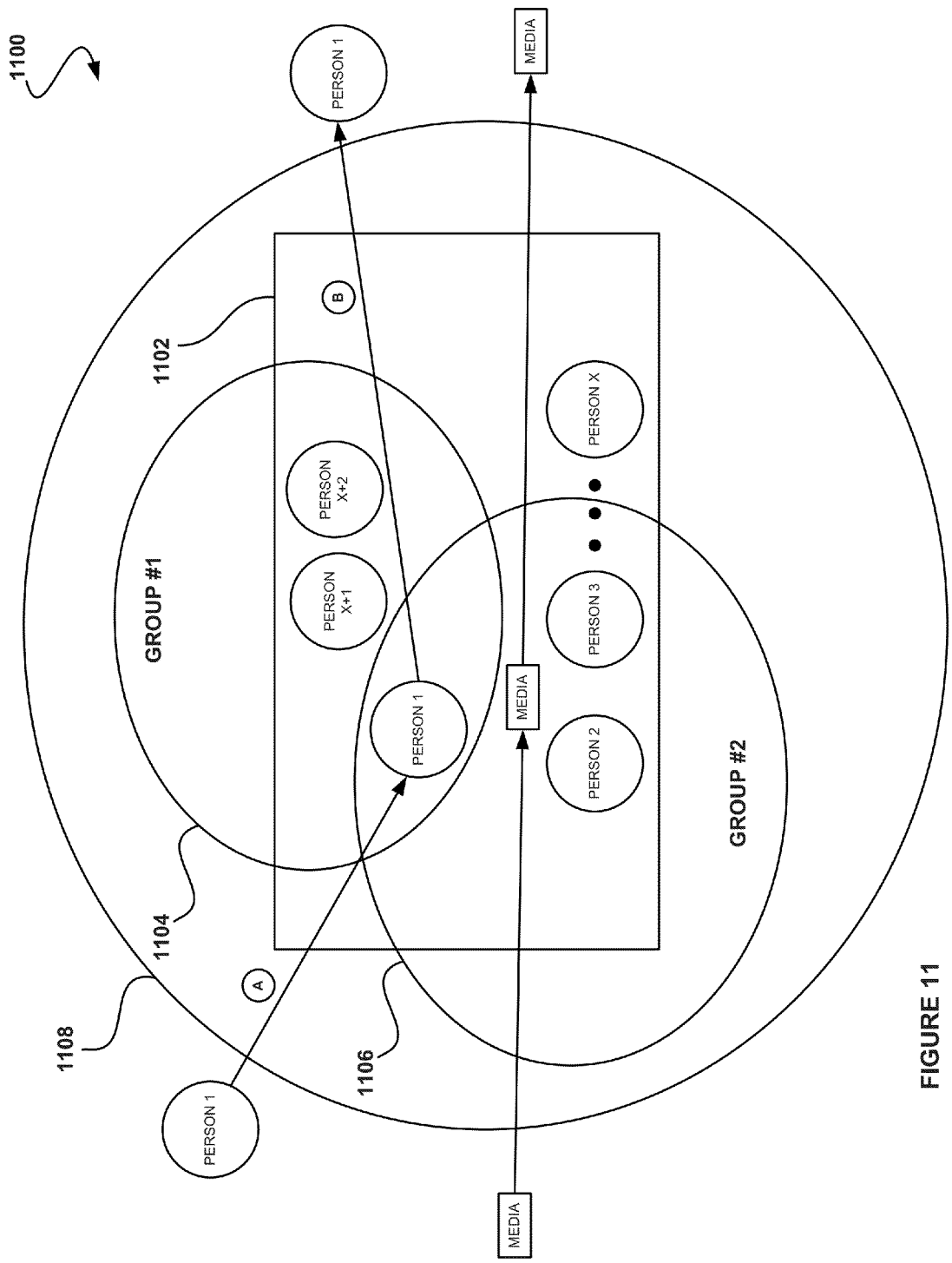
FIG. 11 shows an exemplary implementation of users in a location based social network including multiple groups, in accordance with one embodiment.

FIG. 11 shows an exemplary implementation 1100 of users in a location based social network including multiple groups, in accordance with one embodiment. As an option, the system 1100 may be implemented in the context of the architecture and environment of the previous Figures or any subsequent Figure(s). Of course, however, the system 1100 may be implemented in any desired environment. It should also be noted that the aforementioned definitions may apply during the present description.

As shown, multiple users may congregate at a location, such as an establishment 1102. One or more of the users may decide to establish, or join an already established, location based social network. The location based social network may be a social network for users at the establishment 1102.

In one embodiment, the boundaries of the location based social network may be the boundaries of the establishment perimeter. In another embodiment, a boundary 1108 may be established that encompasses the establishment 1102. In this case, users outside of the boundary 1108 may not have the ability to join the location based social network established by the boundary 1108. In one embodiment, users outside of the boundary 1108 may not have the ability to share or upload media with the location based social network. In one embodiment, the ability to share or upload media while outside the boundary 1108 may be based on whether the user was once a member of the group within the boundary. For example, a first user may join a first group while within the boundary 1108 and may still participate in the first group after moving outside the boundary 1108, until the group expires (e.g., the user went to a friend's party, contributed to the group, left, and then viewed what went on after the user left, etc.).

Additionally, in one embodiment, a user of the location based social network may have the ability to establish a location group within the boundary 1108. For example, a first user may establish a first location group 1104. In one embodiment, the boundaries of the first location group 1104 may be established manually by the first user (e.g., by entering coordinates, by drawing a perimeter on a GUI, by selecting a radius from a point, etc.). In another embodiment, the boundaries of the first location group 1104 may be established automatically (e.g., based on a location of the first user, a predefined group boundary, automatically set to be the same as the boundary 1108, a location of friends of the first user, etc.).

Further, in one embodiment, a second location group 1106 may be established. In various embodiments, the second location group 1106 may be established automatically (e.g., in response to a predetermined number of users joining the first location based group 1104, etc.) or manually (e.g., by a manager, the first user, a second user, etc.).

In one embodiment, members of the first group 1104 may be capable of being members of the second group 1106 and the entire location based social network, such that they coexist. Similarly, members of the second group 1106 may be capable of being members of the first group 1104 and the entire location based social network. In various embodiments, any number of social network groups may be initiated. In one embodiment, the social network may be one of a plurality of hierarchically organized, related social networks.

The ability to join the location based social network may be based on a variety of factors. In one embodiment, the ability to join the location based social network may be based on a location of the user that is attempting to join, relative to the boundaries of the social network. For example, a first user "Person 1" may initially be outside of the boundary 1108 associated with the location based social network and may be restricted from joining the social network or any group associated therewith.

Subsequently, the first user may move to a location within the boundary 1108 (e.g., see movement A). Once inside the boundary, the first user may have to the ability to join the location based social network and/or groups associated therewith. Subsequently, the first user may leave the boundary 1108 associated with the location based social network and/or a group associated therewith (e.g., see movement A). In one embodiment, once the first user has left the boundary, the first user may be restricted from accessing the location based social network or any groups associated therewith.

In various embodiments, any number of aspects of the social network may be restricted based on various criteria. For example, in various embodiments, the ability to become a member of the social network may be restricted, the ability to exclude a member from the social network may be restricted (e.g., based on permissions, etc.), the ability to access content associated with the social network may be restricted, the ability to contribute content in association with the social network may be restricted, the ability to comment on content in association with the social network may be restricted, the ability to rate content in association with the social network may be restricted, merging of the social network with another social network may be restricted (e.g., merging a first group with a second group, etc.), separating the social network from another social network may be restricted (e.g., separating a first group, etc.), and/or various other actions may be restricted.

In one embodiment, the criteria for implementing the restrictions may be controlled by a manager of the social network. As an option, the criteria may include default criteria. For example, in one embodiment, the manager may set the default criteria.

The criteria may include any type of criteria. For example, in one embodiment, the criteria may include whether a current time is within a predetermined time frame. In another embodiment, the criteria may include whether a current time is within a predetermined duration after a cessation of a predetermined event. Further, in one embodiment, the criteria may involve a number of profiles that indicate residence at a predetermined location. Still yet, in one embodiment, the criteria may involve a function of a number of contributions of content and time. In another embodiment, the criteria may involve a distance from a predetermined location.

In one embodiment, multiple aspects of the social network may be restricted based on different criteria. For example, in one embodiment, a first aspect of the social network may be restricted based on a first criteria, and a second aspect of the social network may be restricted based on a second criteria. Furthermore, a third aspect of the social network may be restricted based on a third criteria, etc.

As noted, the location of the users may be automatically detected to be within the boundary 1108 or any other group boundaries. In one embodiment, an application on a user device may send location information to a server associated with the location based social network once the user device is within the boundary 1108. Further, in one embodiment, one or more applications may be automatically downloaded by the user device when the user is within the boundary 1108 or any group boundary. For example, in various embodiments, an application associated with the establishment 1102 may be automatically downloaded by the user device (e.g., a menu application, etc.), a gaming application may be automatically downloaded by the user device, and/or any other application may be downloaded by the user device.

While various applications have been disclosed herein, it should be noted that the ability to prompt location and/or based-social networks may be applied in any manner. For example, social networks may be created around ad-hoc positive events (e.g., news worthy occurrence, celebration, party, etc.), and/or negative events (e.g., terrorist attack, crime, accident, natural disaster, etc.). Further, individuals, organizations, and businesses that are poised to benefit from or provide aid in such events may register and/or pay to have advertisements/notices/instructions pushed or otherwise made available to social network based on targeted advertisements/notices/instructions criteria. Still yet, such entities or the social network service itself may provide incentives (e.g., coupons, compensation, rewards, etc.) for requesters to initiate social networks. Of course, the benefits of initiating a social network (e.g., the ability to control various aspects of the same, etc.) may suffice in terms of incentive and/or motivation.

Figure 12:
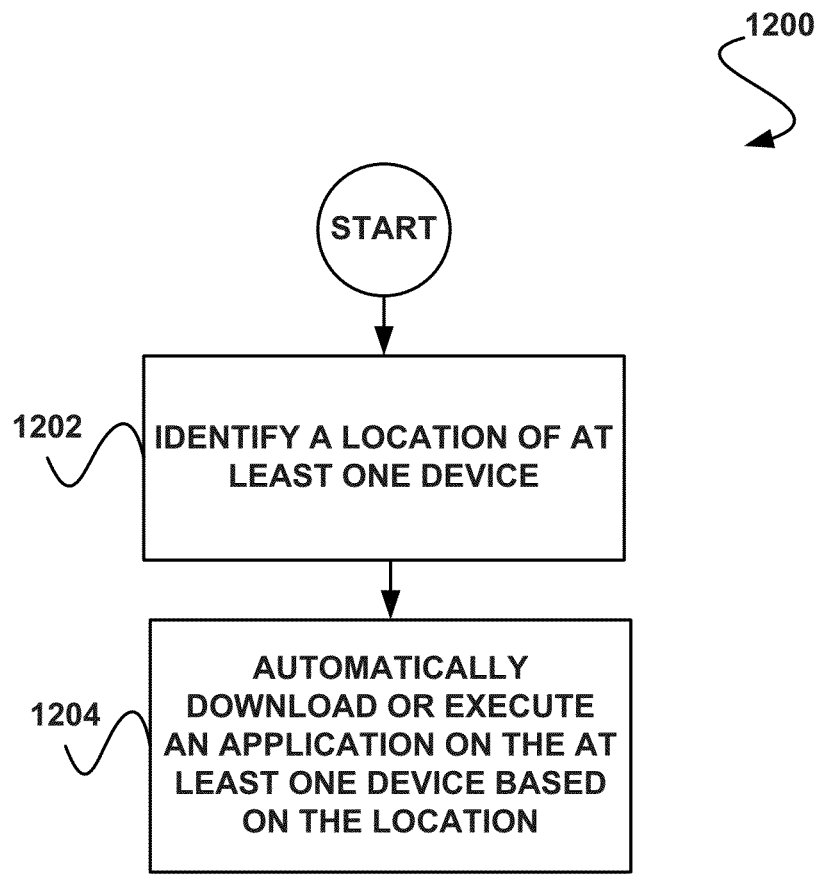
FIG. 12 shows a method for automatically downloading or executing an application on at least one device based on location, in accordance with one embodiment.

FIG. 12 shows a method 1200 for automatically downloading or executing an application on at least one device based on location, in accordance with one embodiment. As an option, the method 1200 may be implemented in the context of the architecture and environment of the previous Figures or any subsequent Figure(s). Of course, however, the method 1200 may be carried out in any desired environment. For instance, the application may or may not be downloaded or executed in connection with a location/time-based social network, and serve to enhance such social network experience. It should also be noted that the aforementioned definitions may apply during the present description.

As shown, a location of at least one device is identified. See operation 1202. The device may include any user device. For example, in various embodiments, the device may include a notebook computer, a tablet computer, a cellular phone, a PDA, and/or any other device.

Additionally, the location of the device may be determined in a variety of ways. In one embodiment, the location of the device may be determined manually. For example, a user of the device may indicate the location by selecting the location on a map, inputting coordinates, inputting an address, and/or any other technique of manually entering information to determine the location.

In one embodiment, the location may be identified utilizing a manual check-in process. For example, a user associated with the device may check-in using a website. In another embodiment, the user may manually check into a location utilizing a unique ID such as a bar code, username, biometric data, and/or any other information.

In another embodiment, the location of the device may be determined automatically. For example, in one embodiment, the location of the device may be determined automatically utilizing an application stored on the device. In this case, the application may provide location information such as GPS coordinates, an address, an establishment name, and/or any other information capable of being utilized to determine the location of the device. In another embodiment, the location of the device may be automatically detected by a second device (e.g., over a network, etc.) based on a signal provided by the device. In various embodiments, the location may be identified utilizing any automated geo-location process and/or a manual confirmation process. Of course, the location may be identified utilizing any of the techniques disclosed herein, or any others, for that matter.

As shown further, an application is automatically downloaded or executed on the at least one device based on the location. See operation 1204. In one embodiment, the device may include computer code for automatically downloading the application. In another embodiment, the device may include computer code for automatically executing the application. In still another embodiment, a first portion of the application may be downloaded in order to enable, unlock, and/or otherwise allow execution and/or access to a fuller functionality in connection with a second portion of the application already installed on the device prior to operation 1202 and/or 1204.

In one embodiment, the location may be identified utilizing code that is part of the application that is downloaded and/or executed. In another embodiment, the location may be identified utilizing code that is separate from the application that is downloaded.

The application may include any type of application. For example, in various embodiments, the application may include at least one of a game application, a business-related application, or a productivity application, a location based social network application, etc. Furthermore, in one embodiment, the application may be associated with an instance. In the context of the present description, the instance associated with the application may refer to any existing or newly generated instance associated with an application.

In one embodiment, the location or a derivative thereof may be stored for reuse. In various embodiments, the location may be stored as a map, coordinates, an address, and/or as any other data associated with the location or a derivative thereof. In one embodiment, the location or a derivative thereof may be stored on the device. In another embodiment, the location or a derivative thereof may be stored on a network storage device (e.g., a networked database, etc.) capable of being accessed by the device.

In one embodiment, information associated with the location may be utilized as a seed to generate a random or pseudo-random data structure. As an option, the random or pseudo-random data structure may be stored in a database. In this way, the database may be queried for the random or pseudo-random data structure. In one embodiment, an instance may be conditionally generated based on the querying.

For example, in one embodiment, information associated with the location may be utilized to generate a seed. The seed may then be stored (e.g., for a specified amount of time, etc.) and then subsequently utilized to generate a random or pseudo-random data structure associated with a gaming instance (e.g., such as a game map, etc.). In one embodiment, the seed may always generate the same random or pseudo-random data structure.

The automatic download and/or execution of the application may occur based on a variety of factors. For example, the automatic download and/or execution may occur as a result of the device being within a specific boundary. In various embodiments, the boundary may be associated with an establishment, a zip code, another user device, a location based social network, and/or any other boundary.

In one embodiment, a map associated with the location may be displayed that displays the location of the at least one device. Additionally, other information may be displayed on the map, instead of the map, or in addition to the map. For example, in one embodiment, an identification of a plurality of applications and an identification of a plurality of other devices associated with the plurality of the applications may be displayed. In various embodiments, the information may be displayed on the map, in a list, in a table, and/or utilizing any other display technique.

In one embodiment, a selection of the application from the plurality of the applications may be capable of being received. For example, a user of the device may select one of the applications displayed by clicking on a name associated with the application. In one embodiment, the automatically downloading or executing may be conditioned upon the selection.

In one embodiment, the automatic downloading or executing may be performed in response to an invitation received from at least one other device. For example, a user of the at least one other device may send an invitation to a friend to download the application (e.g., a game, etc.). As another example, a business may send an invitation to a user to download the application (e.g., a menu application, etc.).

Further, in one embodiment, the application may be utilized by a first device and a second device both of which are resident at the location. For example, the first device and the second device may be capable of interacting in association with the application utilizing peer-to-peer communication. In another embodiment, the first device and the second device may be capable of interacting in association with the application utilizing peer-to-server communication.

In one embodiment, communication between the first device and the second device may be allowed. For example, in one embodiment, the application may allow for communication between the first device and the second device. In various embodiments, the communication may direct or via one or more other devices (e.g., a server, etc.).

Additionally, in one embodiment, the application may be utilized by a first device resident at the location and may be conditionally downloaded or executed by a second device resident at the location based on at least one criteria. The criteria may include any default or user defined criteria. For example, in one embodiment, the criteria may be controlled by a service provider associated with the application.

In one embodiment, the criteria may involve a profile associated with a user of the first device. In another embodiment, the criteria may involve a profile associated with a user of the second device. In another embodiment, the criteria may relate to a relationship between a user of the first device and a user of the second device. In yet another embodiment, the criteria may indicate whether the application is to be shared.

Furthermore, in one embodiment, the application may be conditionally downloaded or executed based on at least one criteria. In one embodiment, the criteria may relate to a price of the application. In another embodiment, the criteria may relate to a size of the application. In another embodiment, the criteria may relate to a rating of the application. Additionally, in one embodiment, the criteria may relate to an acceptance of the downloading or executing. In some embodiment, any such criteria may be set by a user of the device utilizing preferences/settings, etc.

The time the application is active may vary in different embodiments. In one embodiment, the application may remain active and present until a user of the device removes or disables the application. In another embodiment, the application may be removed or disabled automatically (e.g., utilizing another application, code associated with the original application, etc.).

In one embodiment, the removing or disabling may be performed based on the location of the at least one device. For example, in one embodiment, the application may be disabled or removed when the device leaves an area within a boundary (e.g., a boundary associated with another user device, a building, a group location, a zip code, etc.). In another embodiment, the application may be removed or disabled based on a time expiration (e.g., a number of hours, days, months, a predefined date/time, etc.). Of course, any number of factors may contribute to whether and when an application is disabled or removed.

More illustrative information will now be set forth regarding various optional architectures and features with which the foregoing techniques discussed in the context of any of the present or previous figure(s) may or may not be implemented, per the desires of the user. For instance, various optional examples and/or options associated with the identifying of devices of operation 1202, the automatic downloading or execution of operation 1204, and/or other optional features have been and will be set forth in the context of a variety of possible embodiments. It should be strongly noted, however, that such information is set forth for illustrative purposes and should not be construed as limiting in any manner. Any of such features may be optionally incorporated with or without the inclusion of other features described.

Figure 13:
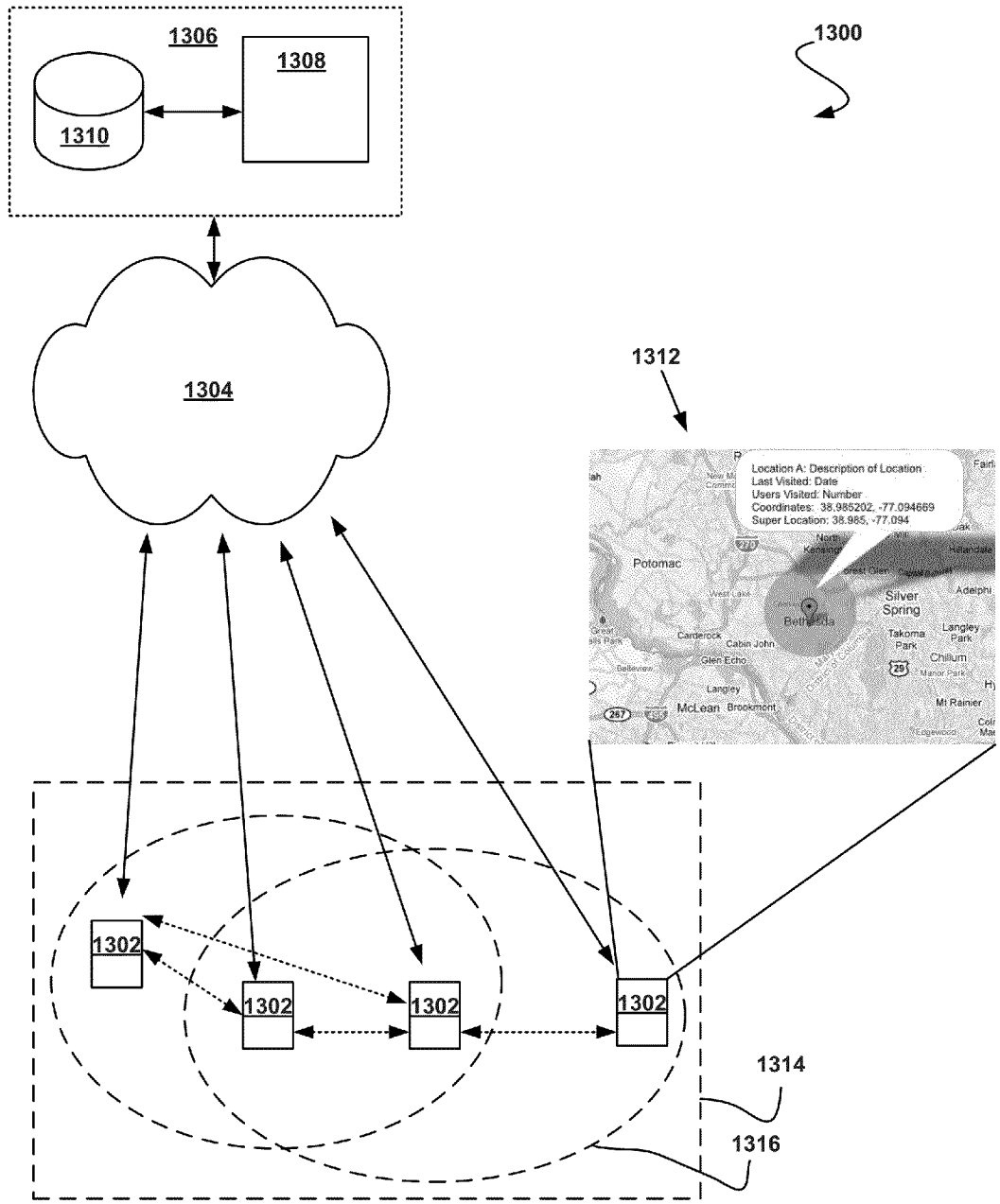
FIG. 13 shows a system for automatically downloading or executing an application on at least one device based on location, in accordance with one embodiment.

FIG. 13 shows a system 1300 for automatically downloading or executing an application on at least one device based on location, in accordance with one embodiment. As an option, the system 1300 may be implemented in the context of the architecture and environment of the previous Figures or any subsequent Figure(s). Of course, however, the system 1300 may be implemented in any desired environment. It should also be noted that the aforementioned definitions may apply during the present description.

As shown, a plurality of user devices 1302 may be capable of communicating over a network 1304 with other user devices and/or network server 1306 including storage 1310 and/or processing circuitry 1308. In one embodiment, one or more of the user devices 1302 may communicate directly between one or more other user devices 1302.

In one embodiment, one or more of the user devices 1302 may be utilized by a first user to automatically download an application, based on proximity to a second user and/or another entity (e.g., a building, etc.). Additionally, in one embodiment, the first user may be notified that the application is downloaded and ready. As an option, the first user may have the option to execute the downloaded application. In one embodiment, the first user may have the ability to automatically join an instance of a game associated with a friend (e.g., based on a location seed, etc.).

In one embodiment, a linkage may be established between the first and second user. In various embodiments, the linkage may include a direct relationship, or an indirect relationship through another user. For example, the first user and second user may have an accepted relationship (e.g., a friend, white listed, etc.). As another example, the first user and second user may be several degrees separated (e.g., the first user is friends with a third who is friends with the second user, etc.).

In one embodiment, the degree of separation may be predetermined (e.g., only for friends of friends, friends of friends of friends, product/service provider-customer, etc.). In another embodiment, the relationship may be an un-established relationship (e.g., a stranger, unconfirmed friend, etc.). In various embodiments, the relationship for users may be filtered based on demographics, having a common location, a history of downloaded applications, similarity, ranking in an application, achievements for an application, and/or any other aspect capable of being filtered.

In one embodiment, a data structure (e.g., a level, a map, etc.) may be generated randomly using a value as a seed. As an option, the seed may be used by an algorithm (e.g., a procedural algorithm, etc.) to generate a random data structure. In one embodiment, the seed may be utilized to ensure the random data structure is the same per seed.

In the context of the present description, an instance refers to a particular instantiation of a data structure. For example, a map may be pre-generated or randomly generated, and then the map may be instanced to create a particular copy of the map. Therefore, in one embodiment, there may be multiple separate instances of a single data structure.

In one embodiment, based on a current location of the user, the location (or a broadened location) may be utilized as a seed to create a specific instance or random generation of an instance. In various embodiments, the instance may include a predetermined map, layout, or configuration, etc. The instance may then be dedicated to a player subset based on a location seed. Additionally, in one embodiment, the instance may be generated using the location seed. In another embodiment, the instance may be generated based on the location seed and created based on the location seed.

For example, a first user may be in location A (e.g., determined using coordinates, landmarks, locations, streets, addresses, any geo location related info, etc.). In one embodiment, if coordinates are used to determine the location of the user, the coordinates may be made more general by removing precision from the coordinate (e.g., incorporating a certain radius around the coordinate, etc.). For example, the coordinates 38.985202, −77.094669 may be broadened to 38.985, −77.094, which encompasses a larger area than the precise location. As another example, the precision of the coordinates may be changed by adding or subtracting a value associated with a precision factor to or from the coordinates.

Using the location seed, a map and/or instance may be generated or allocated. In one embodiment, the coordinates may be used as input to a map generating algorithm as a seed for a random number generator ensuring that a randomly generated map will be random based on that location. Additionally, in one embodiment, a predefined map may be allocated to this seed.

In one embodiment, the seed may be passed to the server and the server may generate the map and pass the map back down to the device. In another embodiment, the device may use the seed itself to generate the map. In some cases, the map generation process may be intensive (e.g., resource, time, etc.) and thus is may be beneficial to allow the server to generate the map, if there is sufficient bandwidth to pass the generated map object back down to the device.

Once a location seed is utilized, a data store may store the location (e.g., in the database 1310, etc.). In one embodiment, the networked server 1306 may receive the precise location and transform it to a more generalized location based on predefined precision parameters. In one embodiment, the location may be associated with a unique ID for a user, allowing the database to track user locations for future use.

As an option, once a user visits a location and the coordinates are sent to the server 1306, the user may have the ability to utilize those previously entered coordinates for a future seed. For example, a user may visit a location associated with the coordinates 38.985202, −77.094669, and the coordinates may be sent to the server 1306. The server 1306 may broaden these coordinates to a second set of coordinates 38.985, −77.094. These coordinates may then be utilized for a seed for generation and instancing.

In one embodiment, a map (e.g., the map 1312, etc.), a list, or a history, etc., may be utilized to display previous coordinates or generalized coordinates, allowing a user to utilize the coordinates as a seed in the future without being at that location. Additionally, depending on the location, the coordinates may not be generalized to allow for specific locations within a larger generalized location. For example, a specific seed may be associated with a store within a city.

In one embodiment, a specific location (e.g., "Location A") may be located within a super location. In the context of the present description, a super location refers to a location area that encompasses another location area. For example, in one embodiment, a super location may be identified by broadening coordinates associated with another location. In another embodiment, the super location may include an area determined based on a defined radius from a center point of another location.

In one embodiment, the location and the super location may be indicated on a map. As an option, clicking or scrolling over an icon associated with the location or the super location may show information associated with the location. In one embodiment, any of the information may be selected (e.g., clicked, etc.) to initiate the generation or instancing associated with that location seed.

In various embodiments, the information displayed may include a name of the location, a description, a last visited date and/or time, a number of users visited (e.g., in last year, month, day, hour, total, etc.), current users at location, current users at parent location (e.g., the super location, etc.), precise coordinates, parent location, advertisements, sponsors, connect options, filter options, and/or various other information. In one embodiment, the super location may be defined in terms of geography (e.g., street, zip, city, town, state, country, etc.). In another embodiment, multiple super geographies may be displayed (e.g., color coded, a boundary indicated, etc.).

In various embodiments, the map may be displayed inside the application, outside the application (e.g., in a launcher application, or any other application capable of displaying the map, etc.) and may be used to launch the application. For example, another application may display the map and allow the user to select a location and application to launch in association with the application. As another example, the application may include the map and allow for the user to select the location.

In one embodiment, an exemplary task flow associated with a launcher application may include 1) displaying a map; 2) selecting a location, options, and an application; and 3) launching the application with the location and options, thereby seeding the generation/instance with the location. In another embodiment, an exemplary task flow inside an application may include 1) displaying the map; 2) selecting the location and options; and 3) seed generation with the location and options.

In one embodiment, the map may display information associated with any other users that have a relationship with the user or location, etc. This may function to allow the user to see friends and unknown people at the same location (or a previously visited location, etc.).

In one embodiment, users of the user devices 1302 may have the ability to communicate with one another directly and/or over the network 1304. In one embodiment, chat functionality may be based on location. In other embodiments, the chat functionality may be specific to a user or a group of users. In one embodiment, a group of users may be predefined by a system or user (e.g., a friends list, user collective, etc).

In one embodiment, a specific virtual location may be overlaid on top of a physical location. As an option, while viewing the map, the user may view other super locations or specific locations of interest in order to be able to go to them to access the associated virtual location (e.g., the instance, map, etc).

Further, in one embodiment, items such as rewards (e.g., currency, items, quality of items, non-player characters, etc.), goals, or challenges (e.g., entities, bosses, quests, etc.), etc., may be associated with each super location or specific location. In one embodiment, the items may be predefined based on location or other information associated with the location. Additionally, in one embodiment, a number of visits to the location by the user may increase or improve the rewards associated with the map.

In another embodiment, the increase or improvement of the rewards associated with the map may depend on completed levels, goals, achievements, purchase/participation activity, and/or various other criteria. As an example, a user may be enticed to visit a restaurant to get a chance to receive a specific item or see a specific entity. In one embodiment, an establishment associated with a location may purchase a chance for certain criteria to appear in the instance after generation (e.g., 10% chance of entity A appearing, and 5% chance of it having item B, etc.). Additionally, in various embodiments, the location information may be accessed online via a database, a peer to peer communication, cached, and/or any other technique to facilitate online, peer, and offline modes.

In one embodiment, a first application may be utilized to determine an opportunity to download a second application capable of being utilized to join an existing game based on a relationship and settings. In various embodiments, the first application and the second application may be separate applications or part of the same application. In various embodiments, the first and/or the second application may include a launcher, an application manager, an installer, the downloaded application itself (e.g., a gaming application, etc.), or any other application capable of downloading an application or information associated with an application.

In one embodiment, an application may monitor a location of the first user and/or a location of at least one other user with a relationship to a first user. For example, in various embodiments, the application may monitor the location of the first user, a location of a friend of the user, locations of friends of friends of the user, strangers, foes, and/or any other users.

In one embodiment, if a first user is within a specified location (e.g., a specific location 1314, or a super location 1316, etc.), it may be determined if at least one second user is utilizing an application that is location enabled (e.g., an application that is enabled, indicated, or predetermined for location sharing, etc.) within the same location. In one embodiment, the second user may have indicated that the application is a sharable application and therefore does not need to be in use.

For example, the second user may have an application installed on a device. If a third user with a relationship to the second user is close, the application associated with the second user may automatically share with the third user with the relationship. In one embodiment, the second user and the third user may both receive a notification to start the application.

In another embodiment, if an application is found upon the first user entering a boundary associated with a location, the application may be transferred (e.g., downloaded, pushed, authorized, etc.) to the device of the first user. In various embodiments, the application may be transferred to the first user from the second user device, from at least one server (e.g., from a single server, distributed servers, peer to peer, the server 1306, etc.), or any other device capable of transferring the application to the first user device. In another embodiment, a notification may indicate that the second user may transfer the application (e.g., from the second user device and/or via a server, etc.) to a device associated with the first user. In various embodiments, the notification may allow the first user to accept the transfer, block a transfer, delay a transfer, start the application, or block the application, etc.

In the context of an embodiment where the application is made available in connection with an "application store," a list of "location-specific" applications may be displayed in a response to a "location-specific" search or selection of an icon or indicia representative of a section of "location-specific" applications. To this end, depending on the specific location searched by a user or a specific location where a user current resides, the "location-specific" application list may vary. Of course, the "location-specific" application list may be tailored based on any other available criteria disclosed herein, as well.

In one embodiment, the application of the second user may include a limit for the amount of times the application may be shared. In another embodiment, the application of the second user may include a limit for the number of concurrent shares. In various other embodiments, the application of the second user may include other restrictions on sharing (e.g., no sharing outside a location, no sharing inside a location, no sharing with a specific device type, no sharing based on specified demographics, no sharing with blacklisted devices/profiles, etc.).

In one embodiment, the application may be authorized for the device of the first user (e.g., authorized on/by the device, at a central authorization device, by the second device, etc.). In one embodiment, the application may query the authorization source (e.g., the server 1306, etc.) to determine if the device is authorized prior to each use, during use, and/or after use.

In one embodiment, after users are separated a distance (e.g., a predetermined distance, a distance outside a communication radius, etc.), the application may be automatically removed and/or de-authorized. In one embodiment, if a first user is using the application at the time the first user travels greater than a predefined distance from a second user associated with the application and/or a location (e.g., a specific or super location, etc.), then the application may be removed or disabled after that usage is complete. If the first user is not using the application, the application may be removed immediately. In various embodiments, information associated with the application may be removed or retained. For example, application data that is not part of the application bundle may be retained for the next time the application is shared with a user (e.g., application settings, user profile, application data, etc.).

In one embodiment, prior to removal the user may be presented with a notification of the removal. In various embodiments, the notification may include an opportunity to purchase the application, download the application, rate the application, rate a friend associated with the application, rate the location, rate the location seed, rate the instance, and/or provide a variety of other feedback or information.

In various embodiments, in addition to automatically downloading the application, or instead of downloading the application, seeds, maps, and instances, etc., may also be automatically downloaded based on location. In one embodiment, these seeds, maps, and instances, etc., may be authorized based on location as well. Therefore, in one embodiment, if a user moves outside of a location, the user may no longer be able to access the location seed associated with that location (e.g., map, instance, etc.).

Further, in various embodiments, the automatic transfer and/or authorization of the application may be associated with or controlled by preferences on the downloading device, the transferring device, a service provider, and/or any other device capable of being used to controlling preferences. The preferences may include any preference capable of being utilized to control the automatic transfer and/or authorization of the application.

For example, in one embodiment, the preferences may include a transfer preference. The transfer preference may indicate that the application may be automatically transferred to other users based on location and/or relationship. In another embodiment, the preferences may include a share preference. The share preference may indicate that the application may be shared (e.g., for a single execution, instance, map, etc.) to other users based on location and/or relationship.

In another embodiment, the preferences may include a removal preference. The remove preference may include preferences for removing the application (e.g., after a defined number of starts or stops, at a specific time, after a predetermined amount of time, etc.). In another embodiment, the preferences may include a genre preference. The genre preference may include a preference associated with allowed or disallowed genres (e.g., crosswords, puzzles, role playing games, massive multiple user online games, first person shooter games, etc.).

In yet another embodiment, the preferences may include a size preference. For example, the size preference may include preferences for allowing or disallowing based on application size. In another embodiment, the preferences may include a cost preference. For example, the cost preference may include preferences for allowing or disallowing based on application cost (e.g., free, less than one dollar, less than two dollars, etc.). As another example, the cost preference may include a monthly allotment. For example, the preference may include not exceeding ten dollars per month for shared purchase applications. Additionally, in one embodiment, the user may receive a notification that allows the user to override a preference (e.g., download preference, size preference, cost preference, etc.).

In another embodiment, the preferences may include a content rating preference. For example, the content rating preference may include a preference for allowing or disallowing an application based on a content rating (e.g., an Entertainment Software Rating Board rating, etc.). In one embodiment, the rating system may be a unique rating for every country (e.g., an everyone rating, a teen rating, a mature rating, etc.). In another embodiment, the preferences may include a user rating preference. For example, the user rating preference may include a preference for allowing or disallowing the application based on a user rating threshold, score, or other user rating (e.g., at least or greater than four stars, at least or greater than 90% positive, etc.).

As one exemplary implementation of the system 1300, using a game finder application, a first user may scan a super location (e.g., the super location 1314, etc.) to find other users in the area. The first user may then retrieve (or be sent) a list of installed applications of a second user. The first user may then select an application that they wish to use with the second user. Based on relationship and preferences, the application may be installed to the device of the first user. In one embodiment, both users may receive a notification indicating that the application is installed. Additionally, in one embodiment, the first and/or second user may indicate the intent to use the application based on the current location seed, and to generate a random map based on the location seed as well as in the same instance.

As another exemplary implementation, using an application, a first user may view an in-application map to find other users in the location. The first user may then send an invite to another user that would authorize the second user to install the application while they are in the location. Once the second user leaves the defined location, the application may be removed.

As another example, users entering a baseball stadium, theme park, concert hall, etc. may have an application associated with the location installed upon entering (e.g., automatically, etc.). Upon exiting, the application may be removed (e.g., automatically, etc.). The application associated with the stadium may include any application such as a gaming application, an application associated with a specific event, an application associated with services at the location, an application associated with a stadium display, and/or any other application.

As another example, users entering a baseball stadium, theme park, concert hall, etc. with a preference set to 'prompt install' may be provided a notification indicating that an application is available in the current area. The notification may also provide the user an option to install the application or decline installation. In one embodiment, users entering a location with a preference set to 'no install' may not receive a notification or installation of the stadium application based on their preference. In another embodiment, users entering a location (e.g., sports stadium, etc.) with a preference set to 'genre: sports install' may have an application associated with the location installed upon entering the location. In another embodiment, there may be an option for only accepting signed applications (e.g., only applications signed by certain companies known as being legitimate, signing authorities, etc.), unsigned applications, all applications, etc.

As another example, a first user at a location may use an application with a map generated based on a location seed and an instance based on the location. A second user at the same location using the same application may then generate the same map using the same (or similar) location seed and enter the same instance based on the location. Thus, both users may be in the same randomly generated map and instance.

As another example, a first user at a location may use an application. The location seed may indicate a pre-generated map with multiple available instances. The user may select (or be assigned) an instance of the pre-generated map. A second user at the same location using the same application may select (or be assigned) an instance of the map. In some cases, a pre-generated map may not be available. In these cases, the map may be generated and optionally stored for future use (e.g., stored on a server, device, etc.).

Of course, the present techniques may be implemented in any desired context beyond sports stadiums, theme parks, concert arenas, etc. For example, a service/product provider (or a service to which the provider subscribes) may make an application accessible to potential customers with at least one goal of such application being to incentive and/or otherwise enable the potential customers to collaborate to achieve a level of individual and/or aggregate savings that is available only in response to a level of aggregate purchase activity surpassing a predetermined amount. For instance, the potential customers who are at a location of the service/product provider may each have the ability to make individual commitments (in response to offers under the control of the service/product provider) and see their potential aggregate purchase level adjust accordingly in connection with a goal. Further, in order to increase the potential aggregate purchase level, current application users may prompt friends and other known persons (who meet requisite criteria) to access the application and participate. Real-time communication (e.g., instant messaging, anonymous on-line chatting, etc.) may also be enabled to allow the potential customers to strategize and/or collaborate with respect to their individual commitments to achieve the goal. More information regarding one exemplary process by which the above techniques may be implemented will be set forth in the context of subsequent figures (e.g., FIG. 17, etc.).

Figure 14:
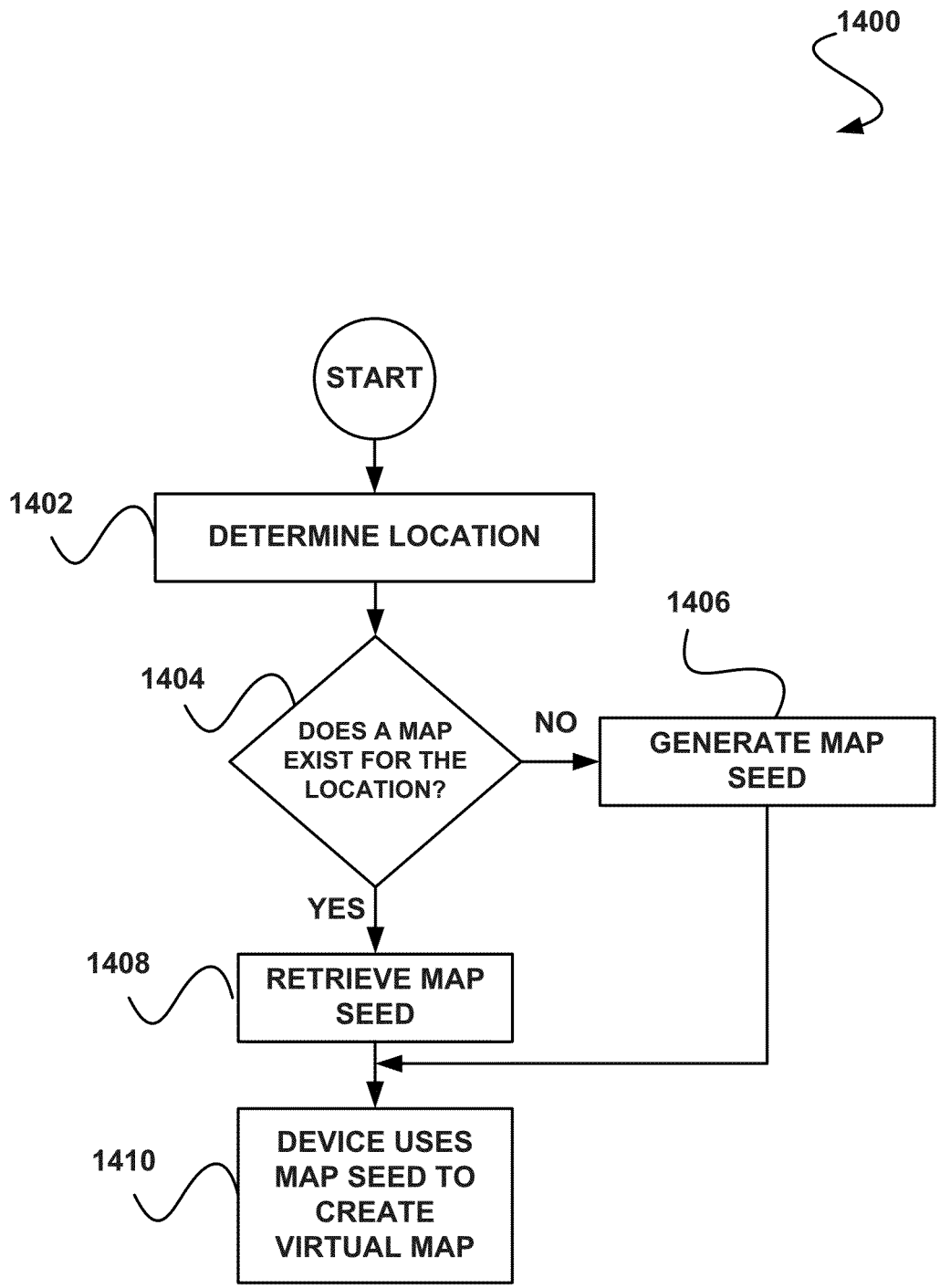
FIG. 14 shows a method for map generation, in accordance with one embodiment.

FIG. 14 shows a method 1400 for map generation, in accordance with one embodiment. As an option, the method 1400 may be implemented in the context of the architecture and environment of the previous Figures or any subsequent Figure(s). Of course, however, the method 1400 may be implemented in any desired environment. It should also be noted that the aforementioned definitions may apply during the present description.

As shown, a location associated with a user device is determined. See operation 1402. In various embodiments, the location may be determined utilizing a geo-location determination technique or the user may provide the location information (e.g., utilizing a check-in process, etc.).

Once the location is determined, it is determined if a map exists for the location. See decision 1404. In one embodiment, determining whether a map exists for the location may include querying a database including map information. In another embodiment, determining whether a map exists for the location may include querying the user device to determine if a map exists for the location.

If a map does not exist for the location, a map seed is generated for the location. See operation 1406. The map seed may be generated utilizing a variety of techniques.

In one embodiment, the map seed may be generated utilizing information associated with the location. For example, information associated with the location may be hashed to generate the seed. In various embodiments, the seed may include information associated with the name of the location (e.g., a restaurant name, a stadium name, an office name, etc.), coordinates of the location, an address of the location (e.g., street number, street name, zip code, city, state, etc.), and/or various other information associated with the location or the location in combination with user information.

If the map does exist, the map seed (or the map itself) may be retrieved. See operation 1408. Optionally, the map seed may be retrieved by the user device, another user device, a network server, etc. For example, in one embodiment, the map seed may be pushed to the user device from the network server. In another embodiment, the map seed may be pushed to the user device from another user device.

In another embodiment, the map seed may be pushed to the user device from a system associated with a location (e.g., a restaurant, a stadium, etc.). In one embodiment, the map seed may be stored at a network database that includes a plurality of existing map seeds. In yet another embodiment, the user of the user device may download the map seed.

Once the map seed is received by the user device, the user device may use the map seed to create a virtual map. See operation 1410. In one embodiment, the map seed may be used as input to generate a data structure associated with the virtual map.

In various embodiments, the map seed may be used to generate a random or pseudo-random data structure. In one embodiment, the map seed may be utilized to perform a map lookup. For example, in one embodiment, the map seed may point to a map in a map database. In one embodiment, the map seed may be detected and/or a map may be generated upon startup of an application associated with the user device.

Figure 15:
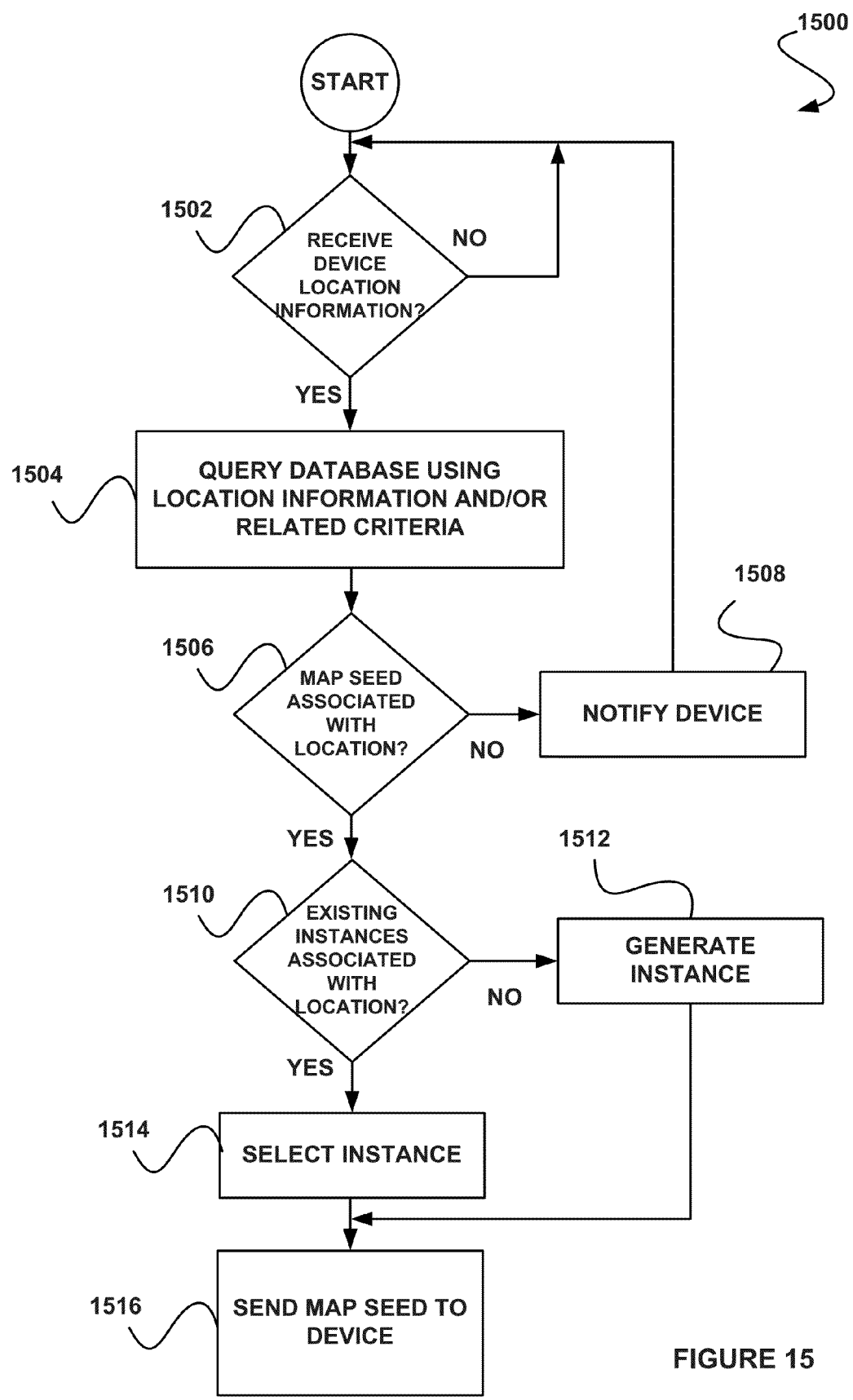
FIG. 15 shows a method for initiation of an application at a server, in accordance with one embodiment.

FIG. 15 shows a method 1500 for initiation of an application at a server, in accordance with one embodiment. As an option, the method 1500 may be implemented in the context of the architecture and environment of the previous Figures or any subsequent Figure(s). Of course, however, the method 1500 may be implemented in any desired environment. It should also be noted that the aforementioned definitions may apply during the present description.

As shown, it is determined whether location information associated with a user device is received at a server. See decision 1502. The location information may include any information associated with a location, such as coordinates, an address, a name of an establishment, and/or various other information. In one embodiment, the location information may be received directly from the user device. In another embodiment, the location information may be received by one or more intermediate devices (e.g., devices associated with a location, etc.).

Once the location information is received, a database (or other storage) is queried utilizing at least a portion of the location information and/or related criteria. See operation 1504. In one embodiment, the database may be queried to determine if a map seed exists for the location. See decision 1506.

If a map seed does not exist for this location, the user device is notified. See operation 1508. In one embodiment, the server may also generate a map seed for the location. In another embodiment, the user device may generate a map seed for the location.

Additionally, it is determined whether an instance already exists for this location. See operation 1510. For example, one or more users may be currently utilizing an instance of a virtual map associated with the location. In one embodiment, the one or more users may be friends of the user associated with the query.

If an instance does not exist, an instance is generated. See operation 1512. If an instance does exist, an instance may be selected. See operation 1514. Of course, in one embodiment, another instance may be generated even if an instance exists. For example, it may be determined (e.g., based on criteria, user preference, a user selection, etc.) that an existing instance is not to be used. Accordingly, a new instance may be generated.

As shown further, a map seed (or the map itself) is sent to the user device. See operation 1516. In one embodiment, the map seed may be associated with the selected instance.

Further, in one embodiment, once an instance is generated or selected (e.g., randomly, based on criteria, etc.), a database associated with the server may be updated. Similarly, in one embodiment, once a seed is generated, sent, and/or utilized, the database may be updated.

In some cases, the seed creation may be a computationally light operation, as opposed to the procedural map generation using the seed. Accordingly, in various embodiments (e.g., depending on hardware/software capability, etc.), the user device or the server may compute the seed, and/or the device or server may generate the map object based on seed. Also, there may be cases where the device simply sends location and the server determines the map, map seed, and/or instance of the map and assigns that device to a particular map and instance ID. Additionally, in one embodiment, the map may be parceled out to the client in chunks as needed (e.g., the server sends the client enough map data to get started and sends additional chunks of map data based on the client usage of the map, etc.). In this case, the client may have no knowledge of the seed/instance that it is currently assigned and the server may coordinate that certain members (e.g., friends A and B, etc.) are in the same map/instance.

An example of a map/instance correlation may include mapping location coordinates to SEED_A, where SEED_A has a max of X users per instance. If X+1 users are trying to use SEED_A, at least two instances of SEED_A map may need to be created and handled by the server. For instance, the server may assign users 1-5 to SEED_A+INSTANCE_1 and the server assign users 6-10 to SEED_A+INSTANCE_2. In one embodiment, any friends may have their own instance if desired. For example, friends 1-2 may be on SEED_A+INSTANCE_3, etc. In this way, each instance of the map may be partitioned based on map design, and process load for the instance on the server, etc.

Figure 16:
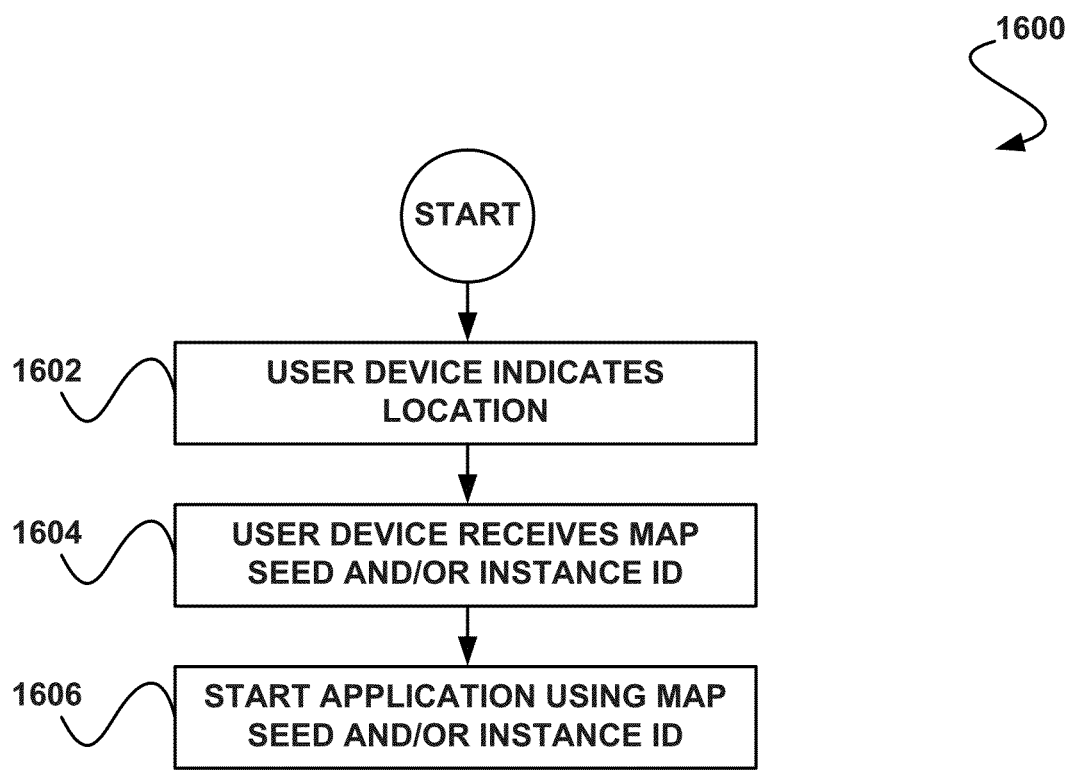
FIG. 16 shows a method for initiation of an application at a user device, in accordance with one embodiment.

FIG. 16 shows a method 1600 for initiation of an application at a user device, in accordance with one embodiment. As an option, the method 1600 may be implemented in the context of the architecture and environment of the previous Figures or any subsequent Figure(s). Of course, however, the method 1600 may be implemented in any desired environment. It should also be noted that the aforementioned definitions may apply during the present description.

As shown, a user device indicates a location. See operation 1602. In one embodiment, the user device may indicate a location based on the location of the user device. For example, when the user device is physically within boundaries associated with a location (e.g., a building, a zip code, etc.), the user device may send location information to a server (e.g., coordinates, an address, etc.).

In another embodiment, a user of the user device may select a previously visited location for indicating a location. For example, in various embodiments, the user may select a previously visited location from a list of previously visited locations, a map showing previously visited locations, and/or any other display technique showing previously visited locations. In one embodiment, location information associated with the selected previously visited location may be sent to a server.

The user device may then receive a map seed and/or map object and/or an instance ID associated with the location. See operation 1604. Using the map seed and/or the instance ID, the application may be started. See operation 1606.

In one embodiment, the instance ID may be associated with an existing instance. As an option, the user may have the ability to select this (or another) existing instance. In the case the user prefers a new instance, the user may have the ability to begin a new instance.

Figure 17:
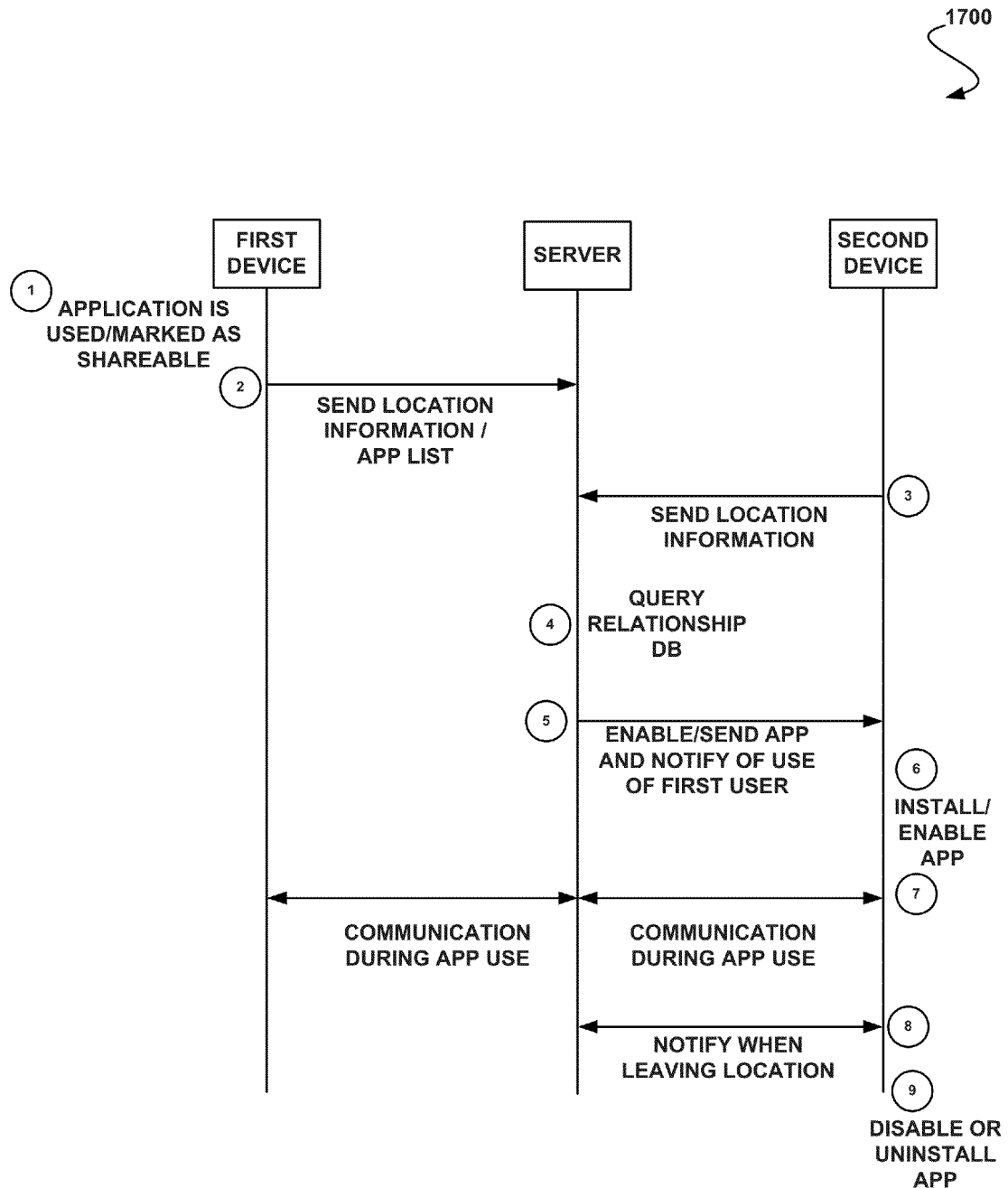
FIG. 17 shows a method for automatically downloading an application, in accordance with one embodiment.

FIG. 17 shows a method 1700 for automatically downloading an application, in accordance with one embodiment. As an option, the method 1700 may be implemented in the context of the architecture and environment of the previous Figures or any subsequent Figure(s). Of course, however, the method 1700 may be implemented in any desired environment. It should also be noted that the aforementioned definitions may apply during the present description.

As shown, an application that is marked as sharable is used by a first device (e.g., see operation 1). Additionally, the first device sends location information to a server (e.g., see operation 2). The first device may also send the application information and/or an application list to the server. In one embodiment, the application may include all applications that the first device has available for sharing. Of course, in other embodiments, operation 1-2 may be omitted in favor of a permanent sharable/location setting by a provider of the application.

Further, a second device may also send location information to the server (e.g., see operation 3). In one embodiment, the server may utilize the location information associated with the first device and utilize the location information associated with the second device to determine if the first device and the second device are within a geographic boundary (e.g., a distance, etc.) that will allow for the sharing of applications. Furthermore, the server may query a relational database to determine the relationship between the user of the first device and the user of the second device (e.g., see operation 4). For example, if the users are friends, potential customers, etc., the sharing of applications may be allowed. As another example, the first user may allow application sharing with all other users.

Still yet, in other embodiments, the database query may involve criteria other than or in addition to the aforementioned relationships. For instance, a status, preferences/settings, profile, etc. of the second user or second device may govern the decision to proceed with subsequent operation 5.

Further, in an embodiment where the first user has purchased the application (or access thereto), the decision process of operation 4 may involve whether the second user is willing to similarly purchase the application (or access thereto). In such embodiment, the first user may be incentivized to prompt sharing of the application with others (e.g., the second user, etc.) by offering a rebate on the first user's application purchase, provide the first user with a credit that may be applied to real or virtual products in connection with the application, etc.

If it is determined that the user of the first device and the user of the second device are capable of sharing applications, the server may send the application to the second user device or may enable the application on the second user device (e.g., see operation 5). The second device may then install and/or enable the application (e.g., see operation 6). The user of the second device may then start the application. In one embodiment, the user of the first device and the user of the second device may communicate during application use (e.g., see operation 7).

Subsequent to the initial application use, the second device may leave the boundary associated with the location. In one embodiment, the server may notify the user of the second device that the second device is leaving or has left the location. In another embodiment, the second user device may notify the server that it is leaving the location (e.g., see operation 8). The second device may then disable and/or uninstall the application (e.g., see operation 9). In one embodiment, the application may be disabled and/or uninstalled after the second user is finished using the application. Of course, it is contemplated that operations 8-9 may, in some embodiments, be omitted in favor of a more persistent application footprint on the second device.

Although FIG. 17 is described in the context of device to server interaction, in another embodiment, peer-to-peer interaction may be implemented. For example, in one embodiment, the first device and the second device may communicate directly with one another. In one embodiment, the second device may perform operations otherwise performed by the server.

Figure 18:
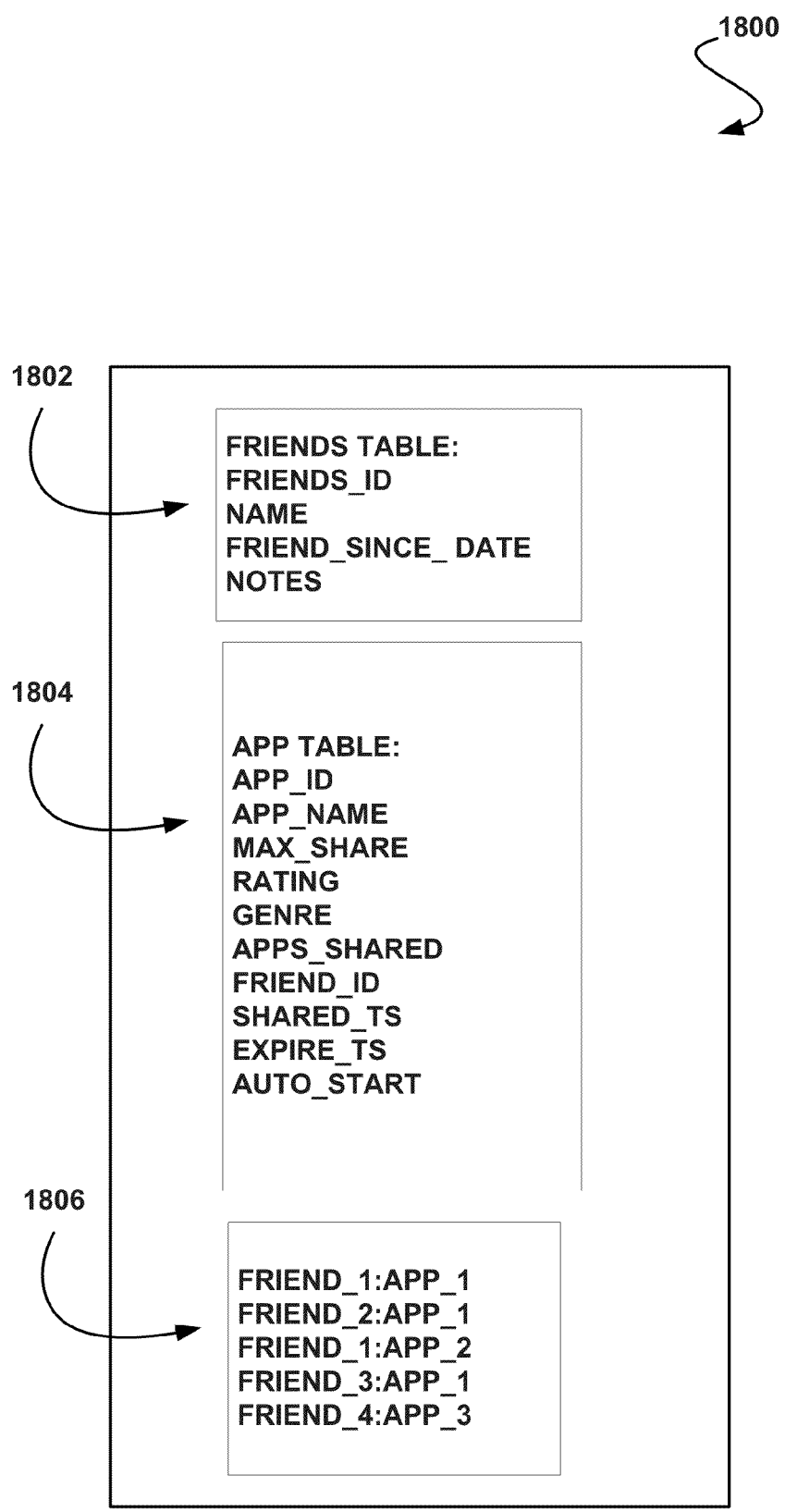
FIG. 18 shows a database storage system illustrating an application sharing data structure, in accordance with one embodiment.

FIG. 18 shows a database storage system 1800 illustrating an application sharing data structure, in accordance with one embodiment. As an option, the system 1800 may be implemented in the context of the architecture and environment of the previous Figures or any subsequent Figure(s). Of course, however, the system 1800 may be implemented in any desired environment. It should also be noted that the aforementioned definitions may apply during the present description.

As shown, the database storage system 1800 may include database structures associated with location based application sharing and relationship information associated with users and/or applications. For example, in one embodiment, a friends table 1802 may be stored. The friends table 1802 may include any information associated with friends and/or foes of a user.

For example, in one embodiment, a "FRIENDS_ID" tag may be utilized to indicate a unique ID for a friend. Additionally, a "NAME" tag may be utilized to indicate a name of the friend. In one embodiment, a "FRIENDS_SINCE_DATE" tag may be utilized to indicate the date when two users became friends. Further, in another embodiment, a "NOTES" tag may be utilized to indicate any notes associated with a friend or the relationship.

In another embodiment, an application table ("APP TABLE") 1804 may be stored. The application table 1804 may include any information associated with the application.

For example, in one embodiment, an "APP_ID" tag, may be utilized to indicate a unique ID for the application. In various embodiments, the unique ID may include information associated with an application name, an application number, and/or any other information. In another embodiment, an "APP_NAME" tag may be utilized to indicate the name of the application.

In another embodiment, a "MAX_SHARE" tag may be utilized to indicate a maximum amount of times an application may be shared. In another embodiment, a "RATING" tag may be utilized to indicate a rating associated with the application. In another embodiment, a "GENRE" tag may be utilized to indicate genre preference.

In yet another embodiment, an "APPS_SHARED" tag may be utilized to link an application to a shared instance. In another embodiment, a "FRIEND_ID" tag may be utilized to indicate a unique ID associated with a friend. In another embodiment, a "SHARED_TS" tag may be utilized to indicate an amount of time the application is shared.

In another embodiment, an "EXPIRE_TS" tag may be utilized to indicate a time the application expires. Additionally, in another embodiment, an "AUTO_START" tag may be utilized to indicate that a friend is to be notified to auto start an application after an install. Of course, any number of tags and information may be stored in the tables.

The table 1806 shows an example of a list of a user's applications shared with other users, in accordance with one embodiment. For example, as shown in the sharing table 1806, a user is sharing a first application and a second application with a first friend; the user is sharing the first application with a second friend; the user is sharing the first application with a third friend; and the user is sharing a third application with a fourth friend. Of course, the table 1806 is only one exemplary implementation linking shared applications to users. For example, in one embodiment, there could be a similar list object that shows the applications on the device of a user and an indication of from where the application was received.

Figure 19A:
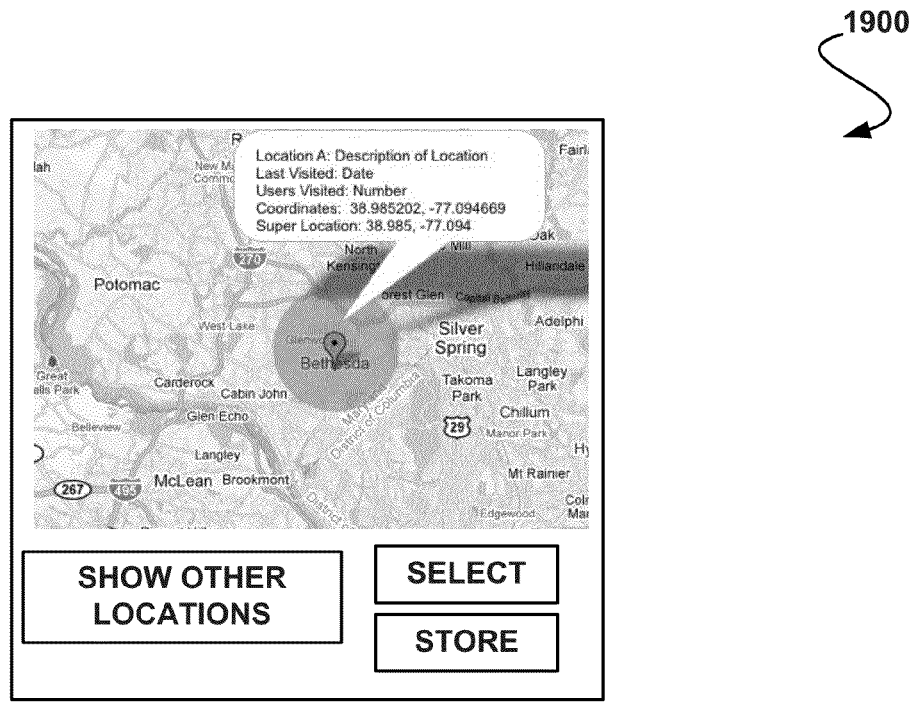
FIG. 19A shows a user interface for sending location information, in accordance with one embodiment.

FIG. 19A shows a user interface 1900 for sending location information, in accordance with one embodiment. As an option, the user interface 1900 may be implemented in the context of the architecture and environment of the previous Figures or any subsequent Figure(s). Of course, however, the user interface 1900 may be implemented in any desired environment. It should also be noted that the aforementioned definitions may apply during the present description.

As shown, the interface 1900 may be capable of displaying a map associated with a location of a user device. Furthermore, in one embodiment, the interface 1900 may be capable of indicating the location of a user and/or a super location on the map. In various embodiments, the super location may include a specific location plus a radius, an abstracted location, a defined perimeter (e.g., around stadium grounds, around a restraint district, etc.), and/or a defined location (e.g., a landmark, city, state, etc.). In one embodiment, a user may have the ability to define a boundary utilizing a trace technique on an interface including a map.

In various embodiments, a user may use the interface 1900 to select a current location or a previously visited location. As an option, the user may have the ability to store information associated with the location, utilizing the interface 1900. The interface 1900 may be capable of displaying any type of information, such as a description of the location, a last visited date (e.g., by the viewing user, by the last user, etc.), the number of users that have visited the location, the number of users currently at the location, coordinates, addresses, and/or various other information. In another embodiment, another user interface may be utilized to send location information, as well as to set sharing and/or update parameters.

Figure 19B:
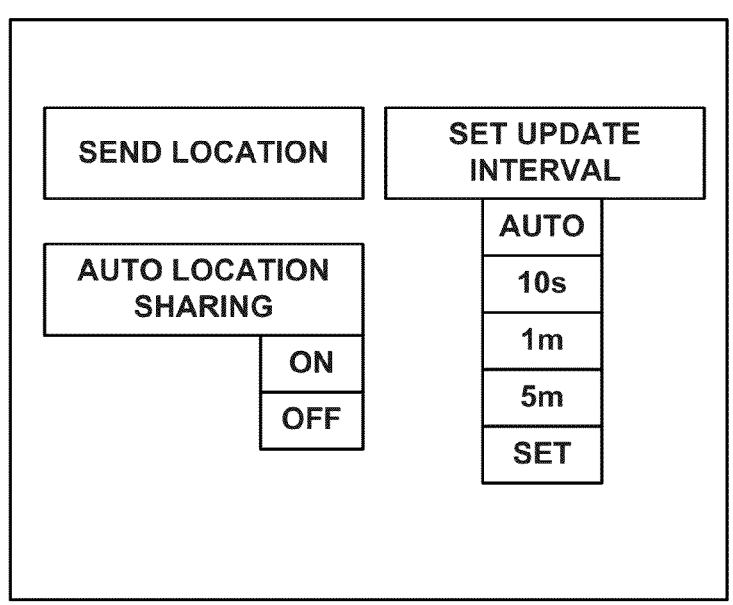
FIG. 19B shows a user interface for sending location information and/or setting parameters, in accordance with one embodiment.

FIG. 19B shows a user interface 1920 for sending location information and/or setting parameters, in accordance with one embodiment. As an option, the user interface 1920 may be implemented in the context of the architecture and environment of the previous Figures or any subsequent Figure(s). Of course, however, the user interface 1920 may be implemented in any desired environment. It should also be noted that the aforementioned definitions may apply during the present description.

As shown, the user interface 1920 may be utilized to share location information with a server and/or another user. The interface 1920 may also be utilized to set parameters including, but not limited to automatic sharing parameters, and update interval parameters (e.g., location update intervals, etc.).

In operation (e.g., utilizing the interface 1900, 1920, another interface, or an automatic process, etc.), a user device may send location information to a server and/or another user device. The server and/or the other user device may then query a database to determine whether there is a location match. If there is, the server may return a map or a map seed associated with the location to the user device. The user may then have the option to select the location and/or an instance associated with the location (e.g., utilizing the interface 1900, 1920, or another interface, etc.) and may start the application.

In another embodiment, a first user may be using an application. The device of the first user may send location information and/or an application list to a server. A second user may also send location information to the server. The server may then verify relationship information of the first user and the second user. The server may also determine whether the application of the first user is a shareable application.

If the application is shareable, the server may send the application to the device of the second user and the application may install, enable, and run. As an option, the second user may join an application instance associated with the first user, based on a proximity of the two users. The second user may then move outside of the proximity boundary and the application may be disabled and/or uninstalled. The first user and/or the second user may then receive a notification indicating removal. In various embodiments, the interfaces 1900 and 1920, or another interface or process may be utilized to configure optional parameters and/of facilitate the automatic sharing of applications.

In still yet another embodiment, an advertisement may be displayed and/or presented to one or more members associated with a location based social network. For example, as shown in FIG. 7, the advertisement may be displayed to the one or more members associated with the location based social network if at least one criteria is met. As an option, the at least one criteria may be based, in part, on at least one prediction associated with the one or more members.

Further, as an option, the at least one prediction may be based on analytics associated with current data and/or historical data associated with the one or more members. For example, the analytics may include any analysis performed on the current data and/or the historical data associated with the one or more members. As an option, the analytics may include at least one indicator, prediction, and probability associated with the one or more members. Optionally, the analytics may include predicting a time and/or a location associated the one or more members based on the current data and/or the historical data associated with the one or more members.

As an option, the prediction may include a probability that a first member will visit a location at an approximate time, and in response to the prediction, an advertisement may be presented to the first member. Optionally, in response to the prediction, the advertisement may also be presented to at least one other member associated with the first member. As another option, the advertisement may also be presented to the at least one other member associated with the first member in response to the first member accepting the advertisement and/or visiting the location.

For example, the analytics performed on the current data and/or the historical data associated with the first member may indicate that the member has a probability of leaving a first location to go to a second location around a particular time, where the second location is associated with a business type (e.g., a restaurant, a drycleaner, a grocery store, etc.). In the context of the current example, in response to the indication and/or the probability, an advertisement matching the business type and/or being located near the second location may be presented to the first member. Additionally, in the context of the current example, the analytics may be performed on the current data and/or the historical data associated with the at least one other member associated with the first member. Still yet, in the context of the current example, in response to performing the analytics on the current data and/or the historical data associated with the at least one other member, the advertisement may be presented to the at least one other member.

Furthermore, as another option, if the analytics determines that the advertisement should be presented to the first member and the at least one other member associated with the first member, then the advertisement may include a group incentive. As an option, the group incentive may include an improved incentive if the first member and at least one other member accept and patronize a business associated with the advertisement. As another option, the group incentive may include a discount, a reward, a bonus, priority, etc. Optionally, the group incentive may indicate a timeframe associated with the advertisement. Further, the timeframe may indicate that the group incentive is applicable only for a particular location, time, day, week, month, year, date range, etc. Furthermore, as another option, for each additional other member that accepts and patronizes the business associated with the advertisement, a threshold of acceptance may be met (e.g., see step 710 of FIG. 7) that provides the improved incentive. Optionally, the advertisement may include several thresholds of acceptance that may each provide a different improved incentive.

For example, if the member and at least one other associated member accept and patronize the business associated with the advertisement, then a first threshold of acceptance may be met; if the member and at least two other associated members accept and patronize the business associated with the advertisement, then a second threshold of acceptance may be met; and if the member and at least three other associated members accept and patronize the business associated with the advertisement, then a third threshold of acceptance may be met. In the context of the current example, the first threshold of acceptance may be associated with a first percentage discount (e.g., 5%, etc.), the second threshold of acceptance may be associated with a second percentage discount (e.g., 7%, etc.), and the third threshold of acceptance may be associated with a third percentage discount (e.g., 9%, etc.). Optionally, each threshold of acceptance may be based on a total number of acceptances, a percentage of acceptances, etc.

In addition, as yet another option, the advertisement may be presented in association with an interface that includes an indication of a location of the first member and an indication of a location of each of the at least one other member associated with the first member. Optionally, the interface may include an indication that a member has accepted or declined the advertisement and/or text associated with the accepting or declining the advertisement. Further, as an option, if the member has accepted the advertisement, the interface may include an estimated arrival time for the member. Additionally, as yet another option, the interface may include any information associated with the member.

Still yet, as an option, the interface may allow each member to indicate a preference associated with a category and/or type associated with the advertisement. Further, the analytics may include each preference when determining the advertisement to present to each member. For example, the advertisement may include an advertisement for a restaurant specializing in seafood, and the interface may allow each member to disallow seafood restaurants in order to improve future advertisements sent to the first member and the at least one other member associated with the first member. Additionally, as yet another option, each advertisement may be chosen based on at least one of demographics, location, analytics, predication, preferences, etc. associated with the first member and the at least one other member associated with the first member. Furthermore, as an option, the interface may allow the first member to request presentation of an advertisement for a particular selected location, time, and/or criteria.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a mobile device including at least one computer processor and a touch screen display; and
program code for execution by the at least one computer processor and configured for:
administering an information-sharing relationship involving a plurality of profiles, by configuring an expiration of a time period to be user-defined differently for different ones of the plurality of profiles before which a location is shared with the different ones of the plurality of profiles and after which the location is no longer shared with the different ones of the plurality of profiles, causing a first one of the plurality of profiles to have a first expiration associated therewith, wherein sharing is subject to the first expiration and a second one of the plurality of profiles has a second expiration associated therewith, wherein sharing is subject to the second expiration which is different than the first expiration;
displaying, on the touch screen display, a first graphical user interface associated with the first one of the plurality of profiles;
receiving, via the touch screen display, first user input in connection with the first graphical user interface associated with the first one of the plurality of profiles;
in response to the first user input in connection with the first graphical user interface associated with the first one of the plurality of profiles, associating the first expiration with the first one of the plurality of profiles, wherein sharing with the first one of the plurality of profiles is subject to the first expiration;
displaying, on the touch screen display, a second graphical user interface associated with the second one of the plurality of profiles;
receiving, via the touch screen display, second user input in connection with the second graphical user interface associated with the second one of the plurality of profiles; and
in response to the second user input in connection with the second graphical user interface associated with the second one of the plurality of profiles, associating the second expiration with the second one of the plurality of profiles, wherein sharing with the second one of the plurality of profiles is subject to the second expiration which is different than the first expiration;
wherein the first graphical user interface is displayed in response to an interaction with a first icon of an application that provides communication capabilities, and the first user input is received after an interaction with a second icon displayed on the first graphical user interface; and the second graphical user interface is displayed in response to an interaction with a third icon of the application that provides communication capabilities, and the second user input is received after an interaction with a fourth icon displayed on the second graphical user interface;
wherein each of the first graphical user interface and the second graphical user interface is configured to allow separate selection among a plurality of predefined options including an hour option and a day option for setting the first expiration and the second expiration.

2. The apparatus of claim 1, wherein the sharing involves sharing of a location of a user with user devices corresponding with the plurality of profiles.

3. The apparatus of claim 1 wherein the sharing involves sharing of media among user devices corresponding with the plurality of profiles.

4. The apparatus of claim 1, wherein the first expiration and the second expiration are independently updated utilizing the first graphical user interface and the second graphical user interface.

5. The apparatus of claim 1, wherein the first graphical user interface and the second graphical user interface include profile interfaces.

6. The apparatus of claim 1, wherein the first graphical user interface and the second graphical user interface include at least one profile photo and additional selection options.

7. The apparatus of claim 1, wherein each instance of the interaction includes a detection of a user touch on the touch screen; at least one of the profiles includes at least some data associated with a user of the mobile device; the information-sharing relationship involves a social network; information that is shared via the information-sharing relationship includes location-related information; the location is shared by causing display of the location on a map; the location includes a position on the map; the application includes an instant messaging application; the first user input being received in connection with the first graphical user interface associated with the first one of the plurality of profiles, by being displayed while the first graphical user interface is being at least partially displayed; the first user input being in connection with at least one of the hour option or the day option; the first graphical user interface allows separate selection among the plurality of predefined options by including a first setting for the hour option and a second setting for the day option, wherein at least one of the first setting or the second setting is configured for being selected via the first user input; or the second graphical user interface allows separate selection among the plurality of predefined options by including a third setting for the hour option and a fourth setting for the day option, wherein at least one of the third setting or the fourth setting is configured for being selected via the second user input.

8. The apparatus of claim 1, wherein each instance of the interaction includes a detection of a user touch on the touch screen; information that is shared via the information-sharing relationship includes location-related information; the location is shared by causing display of the location on a map; the location includes a position on the map; the application includes an instant messaging application; and the first graphical user interface allows separate selection among the plurality of predefined options by including a first setting for the hour option and a second setting for the day option, wherein at least one of the first setting or the second setting is configured for being selected via the first user input.

9. The apparatus of claim 1, wherein each instance of the interaction includes a detection of a user interaction on the touch screen.

10. The apparatus of claim 1, wherein the location is shared by causing display of the location on a map and the location includes a position on the map.

11. The apparatus of claim 1, wherein the application includes an instant messaging application.

12. The apparatus of claim 1, wherein the first graphical user interface allows separate selection among the plurality of predefined options by including a first setting for the hour option and a second setting for the day option, wherein at least one of the first setting or the second setting is configured for selection via the first user input.

13. The apparatus of claim 1, wherein the hour option dictates at least one of the first expiration or the second expiration after a cessation of a single hour, and the day option dictates at least one of the first expiration or the second expiration after a cessation of a single day.

14. The apparatus of claim 1, wherein at least one of the first icon or the second icon includes a space on a display with textual indicia.

15. A system, comprising:
- at least one server including at least one computer processor and program code for execution by the at least one computer processor and configured for supporting an information-sharing relationship involving a plurality of profiles, by configuring an expiration of a time period to be user-defined differently for different ones of the plurality of profiles before which a location is shared with the different ones of the plurality of profiles and after which the location is no longer shared with the different ones of the plurality of profiles, causing a first one of the plurality of profiles to have a first expiration associated therewith, wherein sharing is subject to the first expiration and a second one of the plurality of profiles to have a second expiration associated therewith, wherein sharing is subject to the second expiration which is different than the first expiration; and
- at least one mobile device including at least one another computer processor, a touch screen display, and program code executed by the at least one another computer processor and configured for:
- displaying, on the touch screen display, a first graphical user interface associated with the first one of the plurality of profiles;
- receiving, via the touch screen display, first user input in connection with the first graphical user interface associated with the first one of the plurality of profiles;
- in response to the first user input in connection with the first graphical user interface associated with the first one of the plurality of profiles, associating the first expiration with the first one of the plurality of profiles, wherein sharing with the first one of the plurality of profiles is subject to the first expiration;
- displaying, on the touch screen display, a second graphical user interface associated with the second one of the plurality of profiles;
- receiving, via the touch screen display, second user input in connection with the second graphical user interface associated with the second one of the plurality of profiles; and
- in response to the second user input in connection with the second graphical user interface associated with the second one of the plurality of profiles, associating the second expiration with the second one of the plurality of profiles, wherein sharing with the second one of the plurality of profiles is subject to the second expiration which is different than the first expiration;
- wherein the first graphical user interface is displayed in response to an interaction with a first icon of an application that provides communication capabilities, and the first user input is received after an interaction with a second icon displayed on the first graphical user interface; and the second graphical user interface is displayed in response to an interaction with a third icon of the application that provides communication capabilities, and the second user input is received after an interaction with a fourth icon displayed on the second graphical user interface;
- wherein each of the first user input and the second user input is configured to independently select between a plurality of predefined options including an hour option and a day option for setting the first expiration and the second expiration.

16. The system of claim 15, wherein the sharing involves sharing of a location of a user with user devices corresponding with the plurality of profiles.

17. The system of claim 15, wherein the sharing involves sharing of media among user devices corresponding with the plurality of profiles.

18. The system of claim 15, wherein the first graphical user interface and the second graphical user interface include profile interfaces.

19. The system of claim 15, wherein the first graphical user interface and the second graphical user interface include at least one profile photo and additional selection options.

20. A non-transitory computer readable medium with code stored therein for execution by at least one computer processor, comprising the code for:
- administering an information-sharing relationship involving a plurality of profiles based on at least a time, by configuring an expiration of a time period to be user-defined differently for different ones of the plurality of profiles before which a location is shared with the different ones of the plurality of profiles and after which the location is no longer shared with the different ones of the plurality of profiles, causing a first one of the plurality of profiles to have a first expiration associated therewith, wherein sharing is subject to the first expiration and a second one of the plurality of profiles to have a second expiration associated therewith, wherein sharing is subject to the second expiration which is different than the first expiration;
- displaying a first graphical user interface associated with the first one of the plurality of profiles;
- receiving first user input in connection with the first graphical user interface associated with the first one of the plurality of profiles;
- in response to the first user input in connection with the first graphical user interface associated with the first one of the plurality of profiles, associating the first expiration with the first one of the plurality of profiles, wherein sharing with the first one of the plurality of profiles is subject to the first expiration;
- displaying a second graphical user interface associated with the second one of the plurality of profiles;
- receiving second user input in connection with the second graphical user interface associated with the second one of the plurality of profiles; and
- in response to the second user input in connection with the second graphical user interface associated with the second one of the plurality of profiles, associating the second expiration with the second one of the plurality of profiles, wherein sharing with the second one of the plurality of profiles is subject to the second expiration which is different than the first expiration;
- wherein the sharing involves sharing of a location of a user with user devices corresponding with the plurality of profiles; wherein the first expiration and the second expiration are independently updated utilizing the first graphical user interface and the second graphical user interface; wherein each of the first graphical user interface and the second graphical user interface is configured to allow separate selection among a plurality of predefined options including an hour option and a day option for setting the first expiration and the second expiration; and wherein the first graphical user interface is displayed in response to an interaction with a first icon of an application that provides communication capabilities, and the first user input is received after an interaction with a second icon displayed on the first graphical user interface; and the second graphical user interface is displayed in response to an interaction with a third icon of the application that provides communication capabilities, and the second user input is received after an interaction with a fourth icon displayed on the second graphical user interface.

* * * * *